(12) United States Patent
Onakado et al.

(10) Patent No.: US 8,357,900 B2
(45) Date of Patent: Jan. 22, 2013

(54) THERMAL INFRARED DETECTING DEVICE

(75) Inventors: Takahiro Onakado, Tokyo (JP); Masashi Ueno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 990 days.

(21) Appl. No.: 12/346,126

(22) Filed: Dec. 30, 2008

(65) Prior Publication Data

US 2009/0194698 A1     Aug. 6, 2009

(30) Foreign Application Priority Data

Jan. 8, 2008   (JP) ................................ 2008-001118
Apr. 28, 2008  (JP) ................................ 2008-116833
Nov. 5, 2008   (JP) ................................ 2008-284425

(51) Int. Cl.
   *G01J 5/00*     (2006.01)
(52) U.S. Cl. .................................................. 250/338.1
(58) Field of Classification Search ................. 250/338.1
See application file for complete search history.

(56) References Cited

U.S. PATENT DOCUMENTS

| | | | |
|---|---|---|---|
| 4,194,220 A * | 3/1980 | Frame | 348/243 |
| 5,650,622 A | 7/1997 | Ookawa et al. | |
| 6,031,219 A * | 2/2000 | Shuke | 250/214 R |
| 6,157,022 A * | 12/2000 | Maeda et al. | 250/214 R |
| 6,211,520 B1 | 4/2001 | Ishikawa et al. | |
| 6,465,784 B1 | 10/2002 | Kimata | |
| 6,851,849 B2 * | 2/2005 | Kimura | 374/163 |
| 7,081,609 B2 * | 7/2006 | Matsumoto | 250/214 C |
| 7,568,388 B2 * | 8/2009 | Ohtsuka et al. | 73/204.15 |

FOREIGN PATENT DOCUMENTS

| | | |
|---|---|---|
| JP | 6-221914 | 8/1994 |
| JP | 2001-264176 A | 9/2001 |
| JP | 2004-233314 A | 8/2004 |
| JP | 2004-364241 | 12/2004 |

OTHER PUBLICATIONS

U.S. Appl. No. 13/035,173, filed Feb. 25, 2011, Onakado, et al.
Japanese Office Action issued Jul. 31, 2012 in Patent Application No. 2008-284425 with Partial English Translation.

* cited by examiner

*Primary Examiner* — Christine Sung
(74) *Attorney, Agent, or Firm* — Oblon, Spivak, McClelland, Maier & Neustadt, L.L.P.

(57) ABSTRACT

A thermal infrared imaging device includes a diode, a power supply for supplying a constant power supply voltage to an anode of the diode through a first interconnection, a voltage setting circuit for setting a voltage across the diode, and a current read circuit which is connected to a cathode of the diode through a second interconnection and the voltage setting circuit, for reading a current of the diode. The voltage setting circuit controls a voltage of a connection point of the second interconnection and the voltage setting circuit to a voltage obtained by subtracting a voltage drop from a predetermined bias voltage. The voltage drop is generated by resistances of the first and second interconnections, and the diode current.

19 Claims, 25 Drawing Sheets

THERMAL INFRARED DETECTING DEVICE

BACKGROUND OF THE INVENTION

1. Field of the Invention

The present invention relates to a thermal infrared detecting device (also referred to as "thermal infrared imaging device") which detects a temperature change generated by an incident infrared ray with two-dimensionally arrayed semiconductor sensors, and more particularly to a thermal infrared detecting device including a diode as a temperature sensor.

2. Related Art

Conventionally, there have been developed various techniques relating to a thermal infrared solid-state imaging device for detecting a temperature change generated by the incident infrared ray with the arrayed semiconductor sensors.

For example, JP-A-2003-110938 discloses a thermal infrared detecting device which applies a constant forward voltage to a diode and utilizes temperature dependence of a current flowing through the diode to detect the temperature change. The constant-voltage drive scheme which applies the constant forward voltage to drive the diode provides a high-sensitivity thermal infrared detecting device. The diode forward current is exponentially increased with respect to the voltage, and therefore a larger rate of change is obtained by detecting change in the forward current when applying the constant forward voltage than by detecting change in the forward voltage when applying the constant forward current. Therefore, the high-sensitivity thermal infrared detecting device can be realized by detecting change in the forward current. JP-A-2000-019015, JP-A-2001-044400 and JP-A-2001-264176 also disclose a similar type of thermal infrared detecting device.

In the conventional thermal infrared detecting device, plural diodes are arrayed as a temperature sensor, each diode is connected to a row selection line and a signal line, and detection result is read from one pixel with the row selection line and the signal line.

In the viewpoint of constant-voltage drive of the diode, the important point is how a predetermined bias is applied to the diode.

Usually, the thermal infrared detecting device using the diode has a hollow heat-insulated structure in which a thermoelectric conversion section is supported by two elongated heat-insulated supporting legs. The diode is incorporated in the thermoelectric conversion section, and interconnection to the diode is embedded in the heat-insulated supporting leg. An infrared absorption section is provided on a top of the thermoelectric conversion section. Infrared ray incident to the infrared absorption section changes infrared energy absorbed by the infrared absorption unit, and the heat-insulated structure converts the change in the infrared energy into change in a temperature of the thermoelectric conversion section. The temperature change is read with the change in current flowing through the diode incorporated in the thermoelectric conversion section. In order to enhance detection sensitivity in the configuration of the thermal infrared detecting device, it is necessary to increase a thermal resistance of the heat-insulated supporting leg. Additionally, a metal constituting the interconnection embedded in the heat-insulated supporting leg is preferably formed into a thin film and thinned and lengthened. Therefore, an electric resistance of the interconnection becomes high such as several kilo ohms to ten and several kilo ohms.

The following problem may be generated when a predetermined bias is applied to the diode under the high electric resistance of the interconnection.

In the case where a predetermined bias voltage is supplied between the interconnection in the supporting leg and a connecting point of a row selection line and a signal line from an external circuit, a temperature is raised at the thermoelectric conversion section to increase the diode current, and a voltage drop is increased at the interconnection in the supporting leg. This causes the diode forward voltage to be decreased, decreasing the current flowing through the diode. On the contrary, when the temperature is lowered at the thermoelectric conversion section to decrease the diode current, the voltage drop is decreased at the interconnection in the supporting leg. This causes the diode forward voltage to be increased, increasing the diode current. Thus, there is phenomenon in which the change in diode current is suppressed by the influence of the voltage drop caused by the interconnection resistance. That is, when the diode temperature is changed to fluctuate the current flowing through the diode, the effective bias voltage applied to the diode is fluctuated due to the fluctuation in voltage drop caused by the diode or a resistance of the interconnection, so that the change in diode current associated with the temperature change is suppressed and temperature detecting sensitivity is lowered. Hereinafter the effect of suppressing the change in diode current by the interconnection resistance is referred to as "negative feedback effect". The negative feedback effect is caused by a resistance from the point to be applied with the constant voltage to the diode. Although major factor of the resistance is the interconnection resistance in the supporting leg, resistances of the row selection line and signal line largely contribute to the resistance causing the negative feedback effect. The negative feedback effect causes a problem in that a characteristic of high sensitivity as the feature of the constant-voltage drive scheme cannot sufficiently be exerted.

JP-A-2003-110938 describes that, regarding the negative feedback effect, fluctuation in voltage across means for converting current to voltage in order to read the diode current (for example, fluctuation in voltage at load resistance or load capacitance which is connected as the converting means) has an influence on the diode bias. JP-A-2003-110938 discloses a method for solving the negative feedback effect, which uses the voltage converting means to always keep a voltage of a connecting point between the signal line and column transistors composing the voltage converting means, constant. However, the method cannot solve the negative feedback effect caused by the resistances of the signal line and selection line to the column transistors as the voltage converting means and the interconnection resistance in the pixel.

JP-A-2000-019015 discloses an infrared detecting device which utilizes temperature dependence of the diode forward characteristic. Specifically, it discloses that the diode bias is changed with a variable voltage source such that the current change (drift current) is suppressed when ambient temperature is changed. Although JP-A-2000-019015 does not disclose the detailed method for changing the diode bias, it can be understood, for example, that the diode bias is lowered to decrease the current in order to keep the output constant when ambient temperature is raised to increase the diode current. However, in the method, it is clear that the negative feedback effect caused by the interconnection resistance generated in the incidence of the infrared ray cannot be eliminated. Originally, JP-A-2000-019015 does not recognize the problem with the negative feedback effect.

JP-A-2001-044400 relates to a structure for widening a diode contact area, and discloses a configuration of the read circuit similar to that of JP-A-2000-019015. Therefore, similarly to JP-A-2000-019015, JP-A-2001-044400 does not solve the problem of the negative feedback effect caused by the interconnection resistance generated in the incidence of the infrared ray. Originally, JP-A-2001-044400 does not recognize the problem with the negative feedback effect.

Similarly to JP-A-2000-019015, JP-A-2001-264176 discloses a temperature measuring device or a thermal infrared image sensor which has a bias voltage circuit inserted serially to the diode to read the forward current by the bias voltage circuit. JP-A-2001-264176 describes the negative feedback effect caused by the resistance, and points out that the negative feedback effect becomes troublesome when a resistor connected for reading the current and raising the output is increased. JP-A-2001-264176 describes that the accurate bias is supplied to the diode irrespective of the resistance of the current read section based on the same recognition about the problem as JP-A-2003-110938. In configuration of JP-A-2001-264176, when a diode with heat-insulated structure is applied to the thermal infrared sensor, since a bias circuit is usually formed in a substrate having no heat-insulated structure, additional interconnection to the bias circuit from the interconnection in the supporting leg in the heat-insulated structure is required, which generates the negative feedback effect.

SUMMARY OF THE INVENTION

The present invention is directed to solve the foregoing problem, and has an object to provide a high-sensitivity thermal infrared detecting device capable of suppressing the negative feedback effect caused by the interconnection resistance.

In order to solve the above problem, in a thermal infrared detecting device according to the present invention, the bias voltage applied between both ends of the diode is controlled at a constant value irrespective of the current flowing through the diode which has a heat-insulated structure and an infrared absorption section. Therefore, the voltage across the diode is always kept constant even if the diode temperature is changed and the diode current is changed. This configuration allows the negative feedback effect caused by the interconnection resistance to be reduced. More specifically, the thermal infrared detecting device according to the present invention has the following configuration.

In accordance with one aspect of the present invention, a thermal infrared detecting device includes: a diode which includes a heat-insulated structure and a infrared absorption section; a power supply for supplying a constant power supply voltage to an anode of the diode through a first interconnection; a voltage setting circuit for setting a voltage applied between both ends of the diode; and a current read circuit which is connected to a cathode of the diode through a second interconnection and the voltage setting circuit to read a current of the diode. The voltage setting circuit controls a voltage at a connecting point of the second interconnection and the voltage setting circuit to a voltage subtracting a voltage drop from a predetermined bias voltage, with the voltage drop generated by a resistance of the first interconnection, a resistance of the second interconnection, and the diode current.

According to the present invention, the voltage across the diode is always kept at a value obtained by subtracting the predetermined bias voltage from the power supply voltage, even if the diode temperature is changed and therefore the diode current varies. Thus, the negative feedback effect caused by the interconnection resistance can be eliminated to realize the high-sensitivity thermal infrared detecting device.

DETAIL DESCRIPTION OF THE PREFERRED EMBODIMENTS

Figure 1:
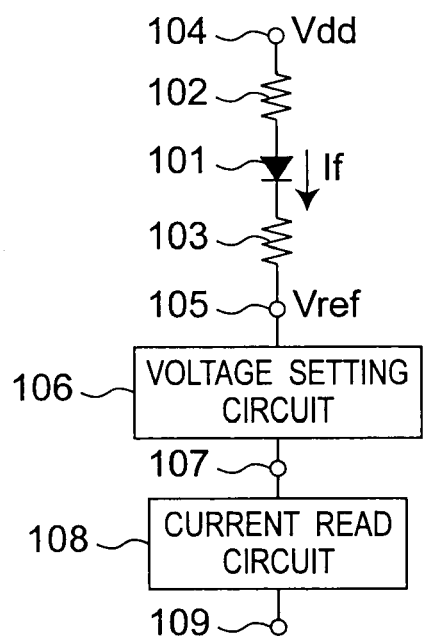
FIG. 1 is a circuit diagram showing a thermal infrared detecting device according to a first embodiment of the present invention.

Preferred embodiments of the present invention will be described below with reference to the accompanying drawings. Thermal infrared detecting devices described below control a bias voltage applied to both ends of a diode which has a heat-insulated structure and infrared absorption section, to a constant voltage, irrespective of a current flowing through the diode. Thus a voltage across the diode is always kept constant independent of change in diode current due to change in diode temperature, so that the negative feedback effect due to the interconnection resistance can be reduced.
First Embodiment
1. Entire Configuration of Thermal Infrared Detecting Device FIG. 1 shows a configuration of a thermal infrared detecting device according to a first embodiment of the present invention. For convenience of explanation, FIG. 1 shows a configuration for a single pixel (including a single diode for detecting infrared ray). The thermal infrared detecting device includes an infrared detecting diode 101. An anode of the infrared detecting diode 101 is connected to a power supply terminal 104 through a resistor 102, and a cathode is connected to a voltage setting circuit 106 through a resistor 103 and a terminal 105. A current If flowing through the diode 101 enters a current read circuit 108 through the voltage setting circuit 106 and a terminal 107, and is detected through a terminal 109. Although the terminals 105 and 107 are expressed as terminal for the sake of convenience, the terminals 105 and 107 may be formed in other form as long as those are electrically connected.

The voltage setting circuit 106 is a circuit for controlling a voltage applied across the diode 101 to be kept constant by controlling a potential at the terminal 105. The voltage setting circuit 106 controls the potential at the terminal 105 according to the current If flowing through the diode 101 in order to keep a voltage applied across the diode 101 constant. The detailed operation of the voltage setting circuit 106 is described later.

Figure 2A:
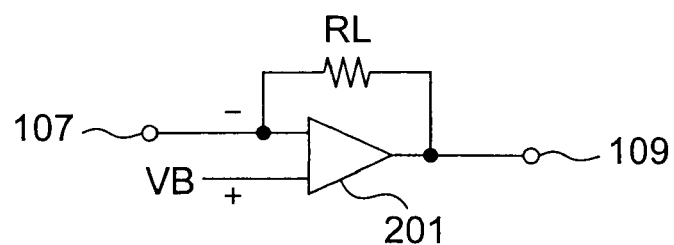
FIGS. 2A and 2B show examples of a current read circuit in the thermal infrared detecting device of the first embodiment of the present invention.
Figure 2B:
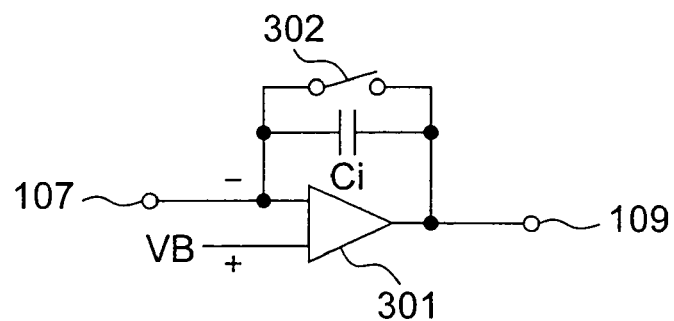

The current read circuit 108 converts an input current to a voltage and can be provided by a well-known art. FIGS. 2A and 2B show examples of configuration of the current read circuit. FIG. 2A shows an example in which the current read circuit 108 is realized by a transimpedance amplifier having feedback from an output of an operational amplifier 201 to an inverting input terminal through a load resistor RL. It provides a product of a current and a resistance RL as an output. Alternatively, as shown in FIG. 2B, the current read circuit may include an integrator with feedback from an output of an operational amplifier 301 to an inverting input terminal through a capacitor Ci and a reset switch 302 provided in parallel with the capacitor Ci. In the configuration shown in FIG. 2B, an integral time Ti is a reset operation cycle of the reset switch 302, and an output is obtained, which is equal to a value obtained by dividing a product of the current and the integral time Ti by an integral capacitance Ci. In the example shown in FIG. 2B, an integral operation is performed and thus a noise reduction effect is also obtained.

Figure 3:
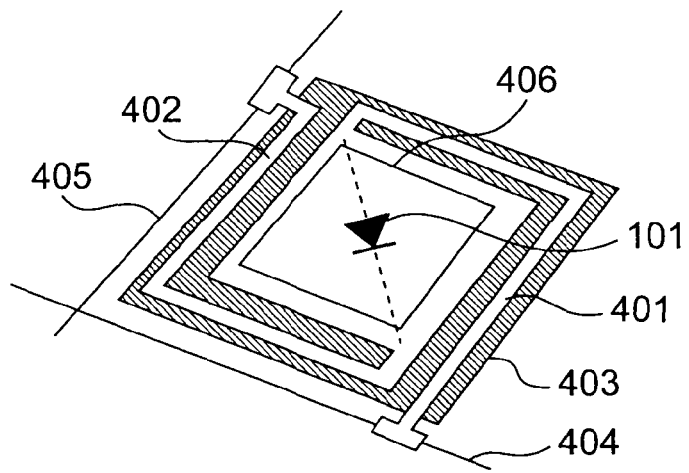
FIG. 3 shows a diode structure of the thermal infrared detecting device of the first embodiment.

As shown in FIG. 3, the diode 101 includes a heat-insulated structure and an infrared absorption structure. Such configuration is well known. In FIG. 3, the infrared absorption structure (thermoelectric conversion section) including a main portion of the diode 101 is supported on a hollow portion 403 provided in a substrate by two elongated heat-insulated supporting legs 401 and 402. Interconnections (not shown) connected to the diode 101 are embedded in the heat-insulated supporting legs 401 and 402. The heat-insulated supporting legs 401 and 402 are connected to a power supply interconnection 404 on a anode side and a signal line 405 on a cathode side, respectively. An infrared absorption film 406 is formed in the portion where the diode 101 exists. The resistors 102 and 103 correspond to interconnection resistances in the heat-insulated supporting legs 401 and 402.
2. Voltage Setting Circuit An operation of the voltage setting circuit 106 will be described. The voltage setting circuit 106 controls a voltage Vref at the terminal 105 in a following manner, $$Vref = Vc - If \cdot Rc \quad (1.1)$$

where Rc is a combined resistance of the resistors 102 and 103, If is a current flowing through the diode 101, and Vc is a predetermined bias voltage.

On the other hand, with Vdd as a power supply voltage supplied to the terminal 104, a forward bias voltage Vf applied to the diode 101 is obtained by the following equation.

$$Vf = Vdd - If \cdot Rc - Vref \quad (1.2).$$

The forward bias voltage Vf can be deformed with the equations (1.1) and (1.2).

$$Vf = Vdd - Vc \quad (2)$$

Accordingly, the forward bias voltage Vf becomes a constant voltage irrespective of the current If. Therefore, the decreased sensitivity caused by the negative feedback effect, which is troublesome in the conventional technique, can be eliminated to provide a high-sensitivity thermal infrared detecting device.

Figure 4:
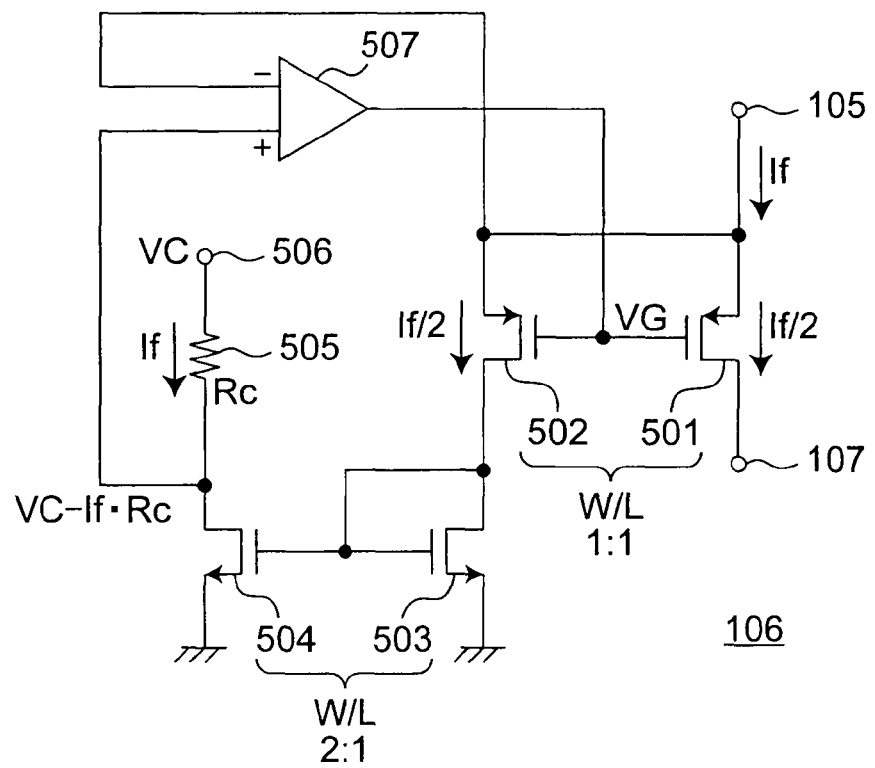
FIG. 4 is a circuit diagram showing a voltage setting circuit in the thermal infrared detecting device of the first embodiment.

FIG. 4 shows a configuration of the voltage setting circuit 106 working as described above. The current flowing through the input terminal 105 and output terminal 107 of the voltage setting circuit 106 is divided into two PMOS transistors 501 and 502 having the same size. A drain of the PMOS transistor 501 is connected to the output terminal 107, and a drain of the other transistor 502 is connected to a current mirror circuit including N-channel transistors 503 and 504. In the current mirror circuit, the current If which is double the divided current If/2 is generated by the transistor 504. That is, a W/L ratio of the transistor 504 is set double that of the transistor 503. A drain of the transistor 504 is connected through a resistor Rc to a predetermined bias voltage Vc. A resistance value of the resistor Rc is equal to the combined value of the resistors 102 and 103 in the infrared detecting portion. Specifically, it may be considered that in the configuration shown in FIG. 3, the diode portion is short-circuited with a thick interconnection with a low resistance. Therefore, the voltage of (Vc−If·Rc) is applied to the drain of the transistor 504. The voltage of (Vc−If·Rc) is fed into a non-inverting terminal of an operational amplifier 507, and the voltage at the terminal 105 is fed into an inverting terminal. An output of the operational amplifier 507 is fed into gates of the transistors 501 and 502. The feedback operation is performed by the action of the operational amplifier 507 such that the voltage at the inverting input terminal, that is, the voltage at the input terminal 105 of the voltage setting circuit 106 always becomes the voltage of (Vc−If·Rc) at the non-inverting input terminal.

An operation in the case in which the current If is increased, and the voltage drops at resistors 102 and 103 are increased, thereby lowering the voltage at the terminal 105 will be described below. In such cases, the voltage at the inverting input terminal of the operational amplifier 507 is lowered, and thus the output of the operational amplifier 507 is raised to lift the gate voltages of the PMOS transistors 501 and 502, thereby decreasing the currents flowing through the PMOS transistors 501 and 502. The current from the diode 101 flows only through the PMOS transistors 501 and 502, and therefore the excess diode current If charges source voltage node of the PMOS transistors 501 and 502. Therefore, the source voltages at the PMOS transistors 501 and 502 and the voltage at the inverting input terminal of the operational amplifier 507 are raised to lower the gate voltages of the PMOS transistors 501 and 502. As a result, the currents flowing through the PMOS transistors 501 and 502 are increased and finally exceed the current flowing through the diode 101. Thus, the reversal phenomenon takes place, the source voltage nodes of the PMOS transistors 501 and 502 are discharged, and the source voltages of the PMOS transistors 501 and 502 and the voltage at the inverting input terminal of the operational amplifier 507 are also lowered. Afterward the similar operation is repeated, and finally stabilization is established when the source voltages of the PMOS transistors 501 and 502 are equal to the voltage of (Vc−If·Rc) at the non-inverting input terminal of the operational amplifier 507.

The voltage at the terminal 105 is controlled to the voltage of (Vc−If·Rc) by the operation of the voltage setting circuit 106, and therefore the voltage applied across the diode 101 can be controlled at (Vdd−Vc), so that a constant bias can be applied to the diode 101 irrespective of the current If. That is, even if the temperature at the diode 101 is changed to vary the current If, the voltage applied to the both ends of the diode 101 always becomes the value obtained by subtracting the constant bias voltage Vc from the power supply voltage Vdd. Thus the negative feedback effect caused by the interconnection resistance can be eliminated to realize a high-sensitivity thermal infrared detecting device.

The configuration for a single pixel of the thermal infrared detecting device is described in the first embodiment. It is understood that the idea of the present embodiment can be applied to the thermal infrared detecting device including plural pixels arrayed (the same holds true for the following embodiments).

Second Embodiment

Figure 5:
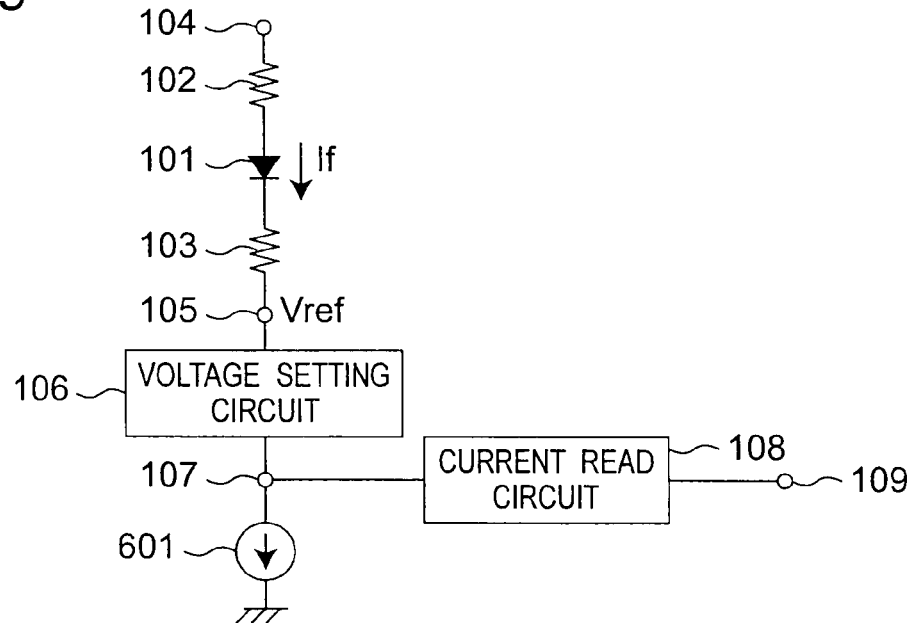
FIG. 5 is a circuit diagram showing a thermal infrared detecting device according to a second embodiment of the present invention.
Figure 6:
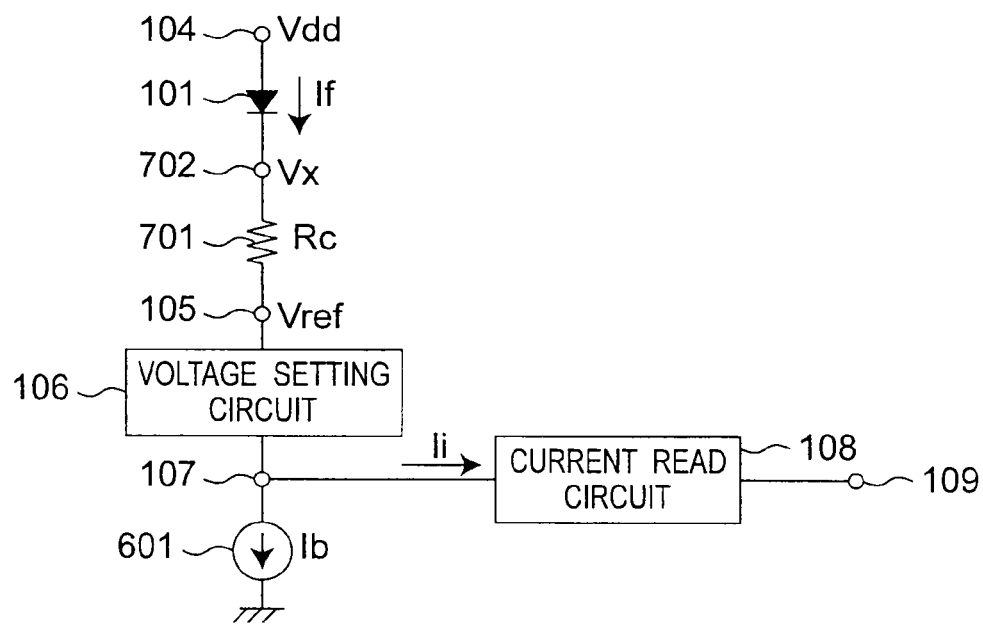
FIG. 6 is an equivalent circuit diagram of the circuit shown in FIG. 5.

FIG. 5 shows a configuration of a thermal infrared detecting device according to a second embodiment of the present invention. The thermal infrared detecting device of the second embodiment differs from that of the first embodiment in that a current source 601 is connected to the terminal 107. An operation of the second embodiment will be described with reference to an equivalent circuit shown in FIG. 6. Referring to FIG. 6, the resistor 102 and the resistor 103 are collected and represented as a resistor 701, the diode 101 and the resistor 701 are connected to each other through a terminal 702, and the voltage at the terminal 702 is set at Vx. Similarly to the first embodiment, Vref is the voltage at the terminal 105 and Rc is the value of the resistor 701.

Figure 7:
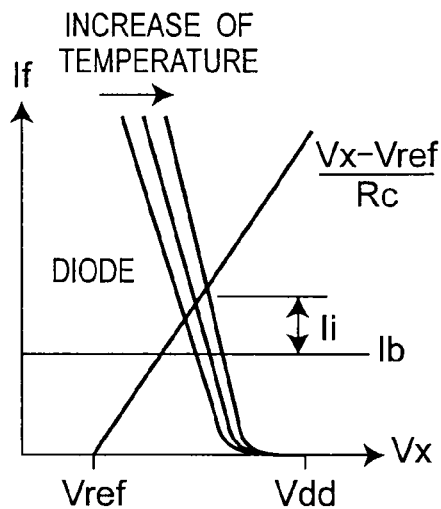
FIG. 7 shows a voltage-current characteristic of the thermal infrared detecting device of the second embodiment.

FIG. 7 shows a voltage-current characteristic of the circuit shown in FIG. 6. In FIG. 7, a horizontal axis indicates the voltage Vx and a vertical axis indicates the current If. In the characteristic of the diode 101, the bias becomes zero when the voltage Vx is equal to the power supply voltage Vdd, and the well-known forward characteristic is obtained when the voltage Vx is lower than the power supply voltage Vdd, and the current is increased when the temperature is raised. On the other hand, the current flowing through the resistor 701 becomes (Vx−Vref)/Rc based on the Ohm's law. Because the current flowing through the diode 101 is equal to the current flowing through the resistor 701, an operating point is obtained as an intersection point of the two characteristic curves.

Generally the diode has a forward current of at least several microamperes, and a rate of change in diode current to temperature is about 6% per one degree Celsius. When applying to the infrared detecting device, depending on an optical system and a setting of a heat insulating property, the temperature of the diode 101 is changed by about 5 mill degree Celsius per 1 degree Celsius of the temperature change of the subject, where a pixel size is set at 40 μm thermal conductance of the heat-insulated supporting leg is set at 100 nW/K, an infrared absorption ratio is set at 80%, and an F value of the optical system is set at 1. Assuming that an imaging temperature of the subject ranges within about ±30 degree Celsius of a room temperature, the temperature change of the diode 101 is at most 0.3 degree Cp-p. That is, the diode 101 has the current change of about 1.8% p-p (≈6%×0.3). It is understand that even if the current of several microamperes is flowing through the diode 101, only a part of the flowing current becomes a signal current. Therefore, unlike the first embodiment, it is not necessary that the whole diode current If be transmitted to the current read circuit 108, but it is enough to transmit part of the diode current If to the current read circuit 108. Accordingly, design to utilize effectively a dynamic range of the current read circuit 108 can be realized to provide a high-sensitivity thermal infrared detecting device having the large dynamic range. A bias current Ib of the current source 601 is used to realize the design, and causes the current If minus the bias current Ib to enter, as a signal current Ii, the current read circuit 108 as shown in FIG. 6. The value of the bias current Ib of the current source 601 may be set according to the imaging temperature range and the pixel characteristic. In the case where the diode current is largely changed according to the change in ambient temperature, the current Ib may be changed according to the ambient temperature.

Third Embodiment

Figure 8:
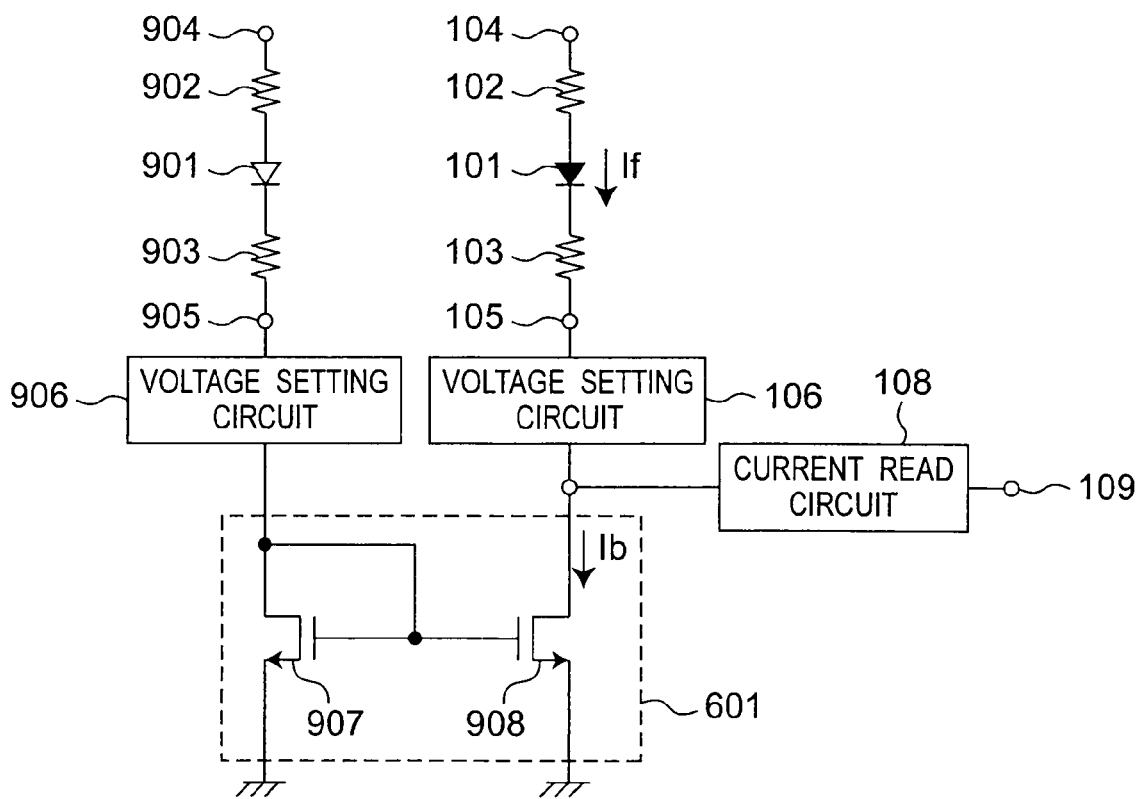
FIG. 8 is a circuit diagram showing a thermal infrared detecting device according to a third embodiment of the present invention.

FIG. 8 shows a configuration of a thermal infrared detecting device according to a third embodiment of the present invention. In the configuration of the third embodiment, the current of the current source 601 (corresponding to a current mirror circuit including transistors 907 and 908) in the configuration of the second embodiment can automatically be changed according to the ambient temperature.

For that purpose, a diode (hereinafter referred to as "reference diode") 901 which does not have the infrared absorption structure and/or the heat-insulated structure is provided, and the same circuit element as the infrared detecting diode 101 is connected in series to the diode 901.

An anode of the reference diode 901 is connected through a resistor 902 to a power supply terminal 904. Usually the same power supply voltage as the power supply terminal 104 is supplied to the power supply terminal 904. A cathode of the reference diode 901 is connected to a voltage setting circuit 906 through a resistor 903 and a terminal 905. The resistors 902 and 903 and the voltage setting circuit 906 are identical to the resistors 102 and 103 and the voltage setting circuit 106, respectively. The reference diode 901 does not have the infrared absorption structure and/or the heat-insulated structure, and therefore does not react with the infrared ray, so that the current is flowing through the reference diode 901 according to the ambient temperature change. The current is duplicated by the current mirror circuit including the NMOS transistors 907 and 908, and is subtracted from the current If flowing through the diode 101, so that the remaining current flows into the current read circuit 108. Thus the current entering the current read circuit 108 is a current obtained by subtracting the current varied according to the temperature at the detecting device. That is, the bias current Ib which is removed from the current If of the diode 101 is controlled so that the output related to the reference diode 901 is kept constant. Therefore, a high-sensitivity thermal infrared detecting device having a large dynamic range and small output fluctuation caused by the ambient temperature change, that is, the small temperature drift, can be realized.

Fourth Embodiment

Figure 9:
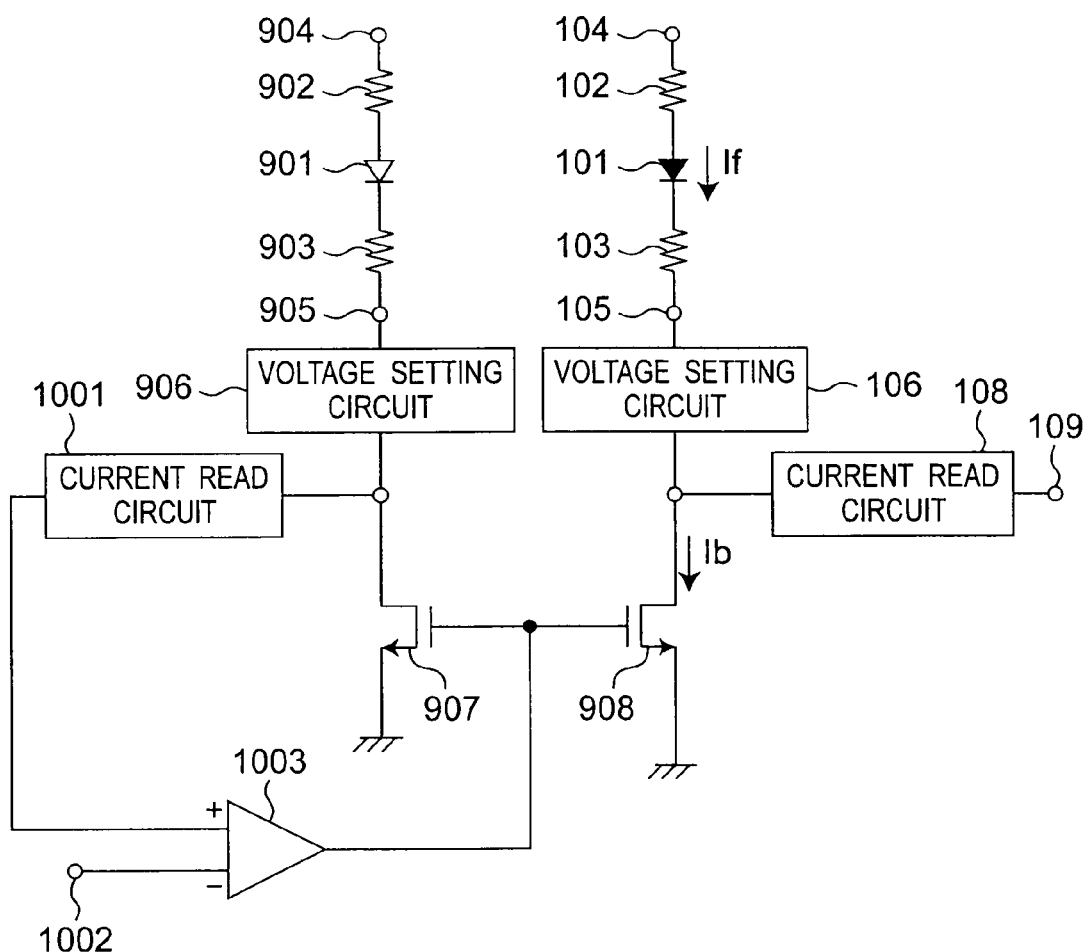
FIG. 9 is a circuit diagram showing a thermal infrared detecting device according to a fourth embodiment of the present invention.

FIG. 9 shows a configuration of a thermal infrared detecting device according to a fourth embodiment of the present invention. In the configuration shown in FIG. 9, the current defined by the NMOS transistor 907 is subtracted from the current flowing through the reference diode 901, and the current value obtained by the subtraction is converted into the voltage by a current read circuit 1001 having a configuration similar to that of the current read circuit 108. The outputs of the current read circuits 108 and 1001 have such polarity that the output voltage is increased as the increase in input current. The output voltage of the current read circuit 1001 for the reference diode 901 is fed into a non-inverting input of an operational amplifier 1003, a reference voltage is fed into an inverting input terminal 1002, and an output of the operational amplifier 1003 is fed into the gates of the NMOS transistors 907 and 908. Thus, the feedback loop is formed such that the output of the current read circuit 1001 is equal to the reference voltage (input voltage of the terminal 1002). Therefore, the gate voltages of the NMOS transistors 907 and 908, or the value of the current Ib to be subtracted from the diode current If is decided such that the output voltage of the current read circuit 1001 for the reference diode 901 is equal to the reference voltage. In the case where polarities of the outputs of the current read circuits 108 and 1001 are reverse, polarity of inputs of the operational amplifier 1003 can be reversed. The configuration of the present embodiment can conduct correction including the temperature drifts of the circuits 906, 907, 108, and 1001, and the output corresponding to the reference diode 901 is always equal to the predetermined reference voltage, so that the temperature drift can be suppressed more accurately compared with the third embodiment.

Fifth Embodiment

Figure 10:
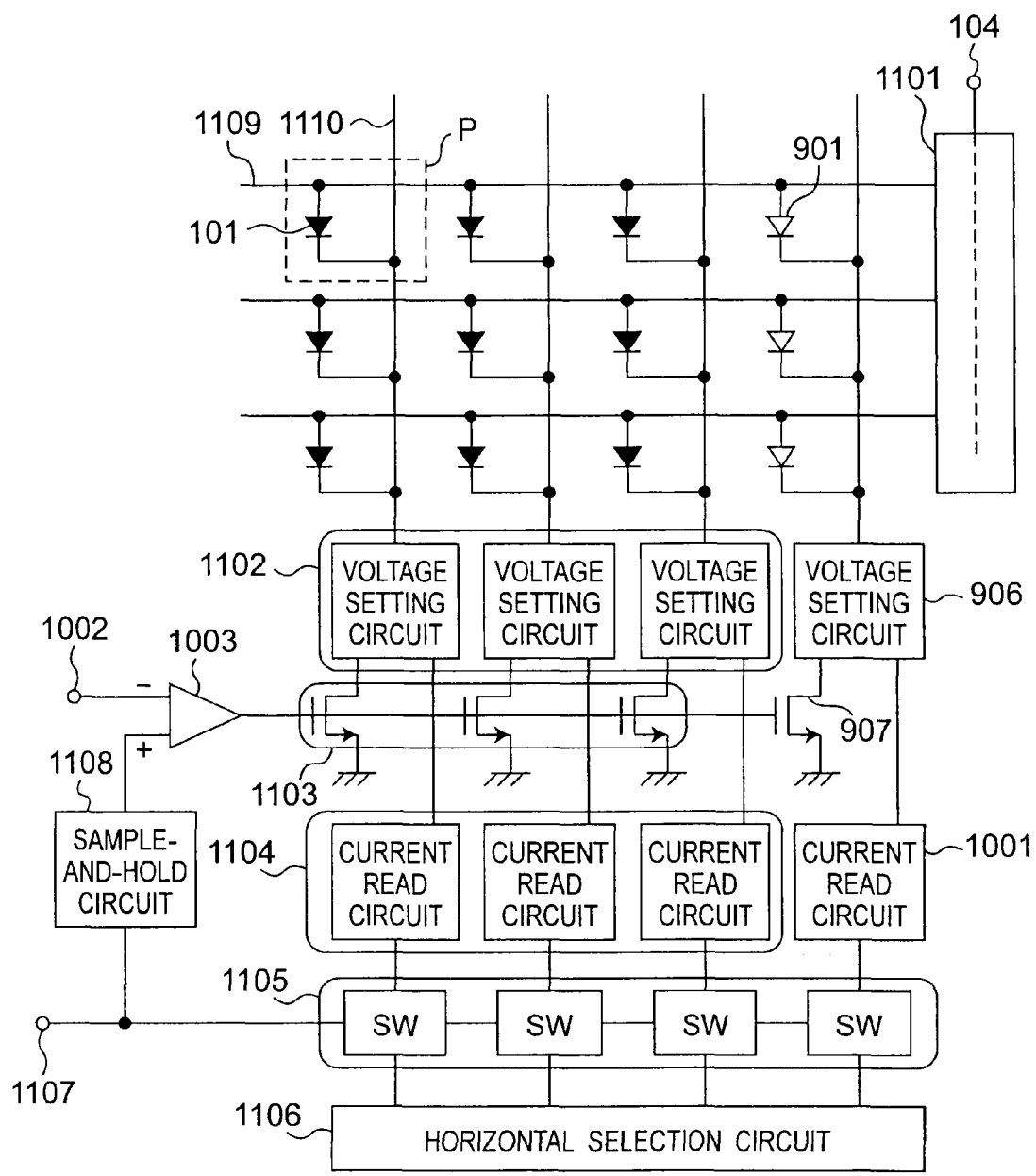
FIG. 10 is a circuit diagram showing a thermal infrared imaging device according to a fifth embodiment of the present invention.

The fourth embodiment describes the thermal infrared detecting device including a single diode 101. However, the idea of the fourth embodiment can also be applied to a thermal infrared imaging device including two-dimensionally arrayed diodes 101. FIG. 10 shows a configuration in which the diodes 101 are arrayed. In FIG. 10, the circuit of the fourth embodiment is applied to the configuration including the diode array. Obviously the idea of other embodiments can also be applied to the thermal infrared imaging device including the diode array.

Referring to FIG. 10, the diodes 101 are arrayed so that a pixel P includes a diode 101 and a 3×3 pixel imaging device is formed. The plural arrayed pixels P constitute a pixel array. The reference diode 901 is disposed at a right end of each row. The anodes of the diodes 101 and 901 are commonly connected in each row, and the vertical scanning circuit 1101 supplies the power supply voltage in each row from the power supply terminal 104. The cathodes of the diodes 101 and 901 are commonly connected in each column. A voltage setting circuit 1102 provided in each column is connected to the cathode of the diode 101, and the voltage setting circuit 906 is connected to the cathodes of the reference diode 901. The outputs of the voltage setting circuits 1102 and 906 are connected to the current sources 1103 and 907 and the current read circuits 1104 and 1001.

The outputs of the current read circuits 1104 and 1001 are connected to a horizontal selection switch 1105. The horizontal selection switches 1105 are sequentially turned on by a control signal supplied from the horizontal selection circuit 1106 to lead the outputs of the current read circuits 1104 and 1001 to an output terminal 1107.

When the output relating to the reference diode 901 is supplied, a sample-and-hold circuit 1108 samples and holds the output, and feeds the output into the non-inverting input terminal of the operational amplifier 1003. The reference voltage is fed into the inverting input terminal of the operational amplifier 1003 from the terminal 1002. The reference diode 901 is provided in each row, and thus the currents flowing through the current sources 1103 and 907 are controlled such that the output of the reference diode 901 is equal to the reference voltage. A lowpass filter may be inserted in the output of the operational amplifier 1003. Therefore, the feedback effect caused by the output from the reference diode 901 can be averaged to provide the more stable output. Accordingly, a thermal infrared imaging device having high sensitivity and high dynamic range and being capable of suppressing temperature drift with high accuracy can be realized.

Resistance contribution of a drive line 1109 which is interconnection commonly connecting the anodes of the diodes 101 and 901 is different between the pixel at the left end and the pixel at the right end of the same row. Resistance contribution of a signal line 1110 which is interconnection commonly connecting the cathodes of the diodes 101 is different between the pixel at the upper end and the pixel at the lower end of the same column. Therefore, preferably the resistances of the interconnections are sufficiently decreased compared to the resistances of the heat-insulated supporting legs provided in the diode 101.

The voltage setting circuits 1102 and 906 control the voltages at the connecting points of the signal line 1110 and the voltage setting circuits 1102 and 906 to the voltage obtained by subtracting a voltage drop from a predetermined bias voltage. The voltage drop is generated by the resistance (first and second interconnection resistances) of the heat-insulated supporting legs, the resistances of the signal line 1110 and drive line 1109, and the currents If of the diodes 101 and 901.

In order to avoid as much as possible the influence of the interconnection resistance, the resistors (resistor 505 in FIG. 4) provided in the voltage setting circuits 1102 and 906 are changed in a stepwise manner in each row. Further, a resistance of a power supply line (shown by a broken line) vertically running from the power supply terminal 104 in the vertical scanning circuit 1101 is set at 1/(number of horizontal pixels) of the resistance of each interconnection 1110 commonly connecting the cathodes of the diodes 101 and 901. The reason why the ratio is set at 1/(number of horizontal pixels) is as follows. The current multiplied by the number of horizontal pixels is flowing through the power supply line vertically running in the vertical scanning circuit 1101. Thus the power supply line vertically running in the vertical scanning circuit 1101 apparently contributes as the resistance obtained by multiplying by the number of horizontal pixels the resistance of the interconnection commonly connecting the cathodes of the diodes.

Sixth Embodiment

In the fifth embodiment, when the contributions of the resistance of the interconnection commonly connecting the anodes of the diodes in each row and the resistance of the interconnection commonly connecting the cathodes of the diodes in each column cannot be neglected compared with the resistance of the heat-insulated supporting leg, not only the difference in resistance between the pixels is hardly corrected, but also the following problem is possibly generated. When the strong infrared ray is incident to one pixel, the diode current of the one pixel is increased. Because the anodes of the diodes are commonly connected, the voltage drop on the commonly connecting interconnection is changed by the influence of the current change of the one pixel. This changes the anode voltages of the diodes of other pixels located on the same row as the one pixel so that "false signal" may be generated. Particularly, when the pixel size is reduced, it is necessary to reduce an interconnection width, which remarkably increases the adverse effect. The configuration to solve this problem will be described below.

Figure 11:
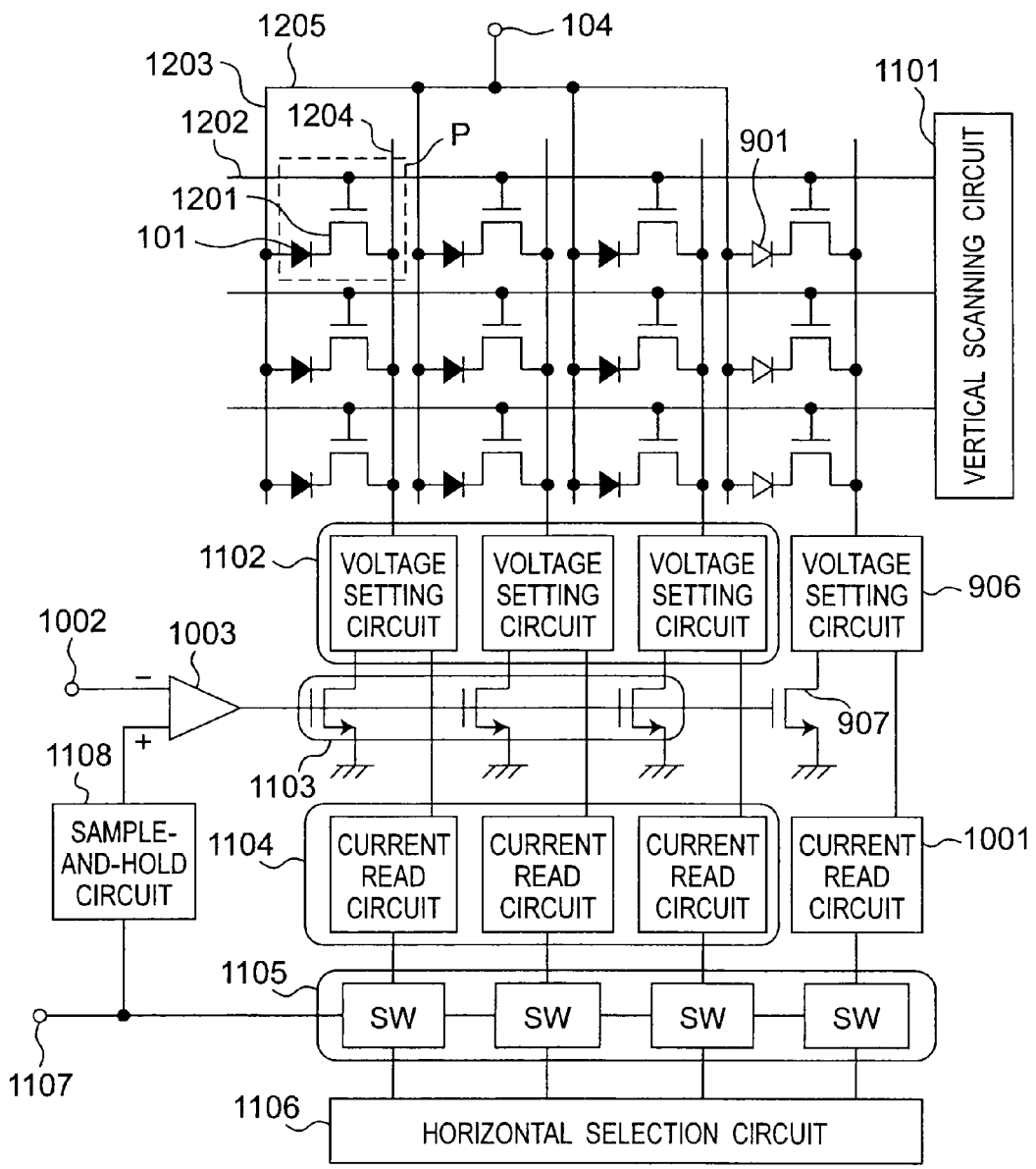
FIG. 11 is a circuit diagram showing a thermal infrared imaging device according to a sixth embodiment of the present invention.

FIG. 11 shows a configuration of a thermal infrared imaging device according to a sixth embodiment of the present invention. The pixel P includes a diode 101 and a selection MOS switch 1201 which are connected in series. The cathode of the diode 101 is connected to one of terminal of the selection MOS switch 1201. The gates of the selection MOS switches 1201 are commonly connected in each row with a selection line 1202. The vertical scanning circuit 1101 sequentially applies a row selection signal to the gates of the selection MOS switches 1201. The anodes of the diodes 101 are commonly connected in each column with a power supply line 1203. The other terminal of each selection MOS switch 1201 is commonly connected in each column with a signal line 1204. The power supply lines 1203 are commonly connected between columns with a common power supply line 1205 and connected to the power supply terminal 104. Since the common power supply line 1205 is located outside the pixel array, even if the pixel size is reduced, the interconnection width can be set sufficiently wide to neglect the resistance contribution. The voltage setting circuits 1102 and 906 control the voltages at the connecting points of the signal line 1204 and the voltage setting circuits 1102 and 906 to a voltage obtained by subtracting a voltage drop from a predetermined bias voltage. The voltage drop is generated by the resistance (first and second interconnection resistances) of the heat-insulated supporting legs of the diode, the on-resistances of the MOS transistor 1201, the resistances of the signal line 1204 and power supply line 1203, and the current If of the diode.

Figure 12:
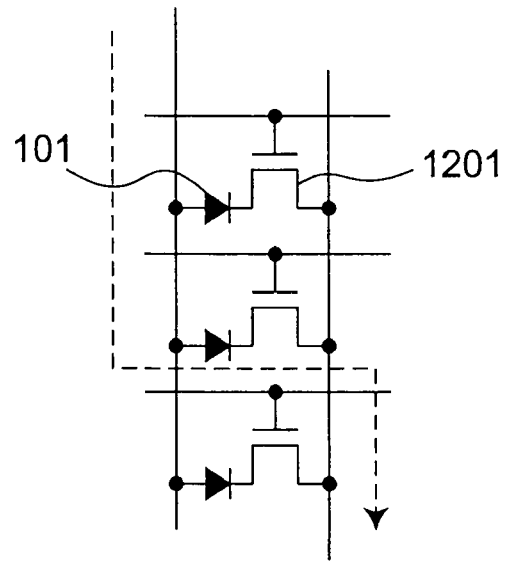
FIG. 12 is a circuit diagram for a one-row pixel in the thermal infrared imaging device of the sixth embodiment.

In the pixel P, the selection MOS switch 1201 selects the row, and thus the current component flowing in the row direction is eliminated unlike the fifth embodiment. When the power supply line 1203 is equalized to the signal line 1204 in the interconnection width, the resistances of the power supply line 1203 and signal line 1204 become identical. Therefore, as shown in FIG. 12, even if any row is selected, the resistance connected to the diode 101 includes the resistance (power supply line resistance) of the one signal line, and the on-resistance of the selection MOS switch 1201 in addition to the resistance of the heat-insulated supporting leg (not shown, first interconnection). The same holds true for any pixel row. Not only the resistance becomes identical in all the pixels, but also only the current of the selected diode is flowing through the power supply line or signal line in the pixel. Therefore, the false signal is not generated. Accordingly, because the difference in resistance between the pixels caused by the diode array shown in FIG. 10 is not generated, the false signal is not generated, and a thermal infrared imaging device having high sensitivity and high dynamic range and being capable of suppressing temperature drift with high accuracy can be realized.

Seventh Embodiment

Figure 13:
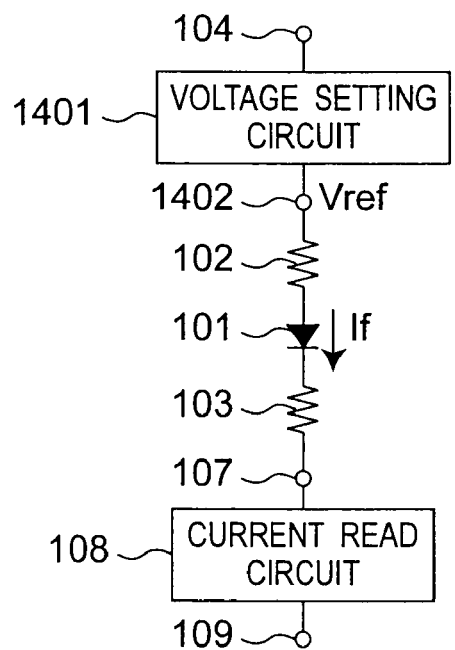
FIG. 13 is a circuit diagram showing a thermal infrared detecting device according to a seventh embodiment of the present invention.

In the sixth embodiment, the voltage setting circuit is provided on the cathode side of the diode. Alternatively the voltage setting circuit may be provided on the anode side of the diode. FIG. 13 shows an exemplary configuration of a thermal infrared detecting device in such a case. Referring to FIG. 13, a voltage setting circuit 1401 is provided between the power supply terminal 104 and the resistor 102 connected to the anode of the diode 101. The voltage setting circuit 1401 controls the voltage Vref at the terminal 1402 in the following manner:

$$\text{Vref} = Vc + If \cdot Rc \tag{3.1}$$

where Rc is a combined resistance of the resistors 102 and 103, If is a current flowing through the diode 101, and Vc is a predetermined bias voltage.

On the other hand, the forward bias voltage Vf applied to the diode 101 is obtained by the following equation.

$$Vf = \text{Vref} - If \cdot Rc \tag{3.2}$$

The forward bias voltage Vf can be deformed as follows by the equations (3.1) and (3.2).

$$Vf = Vc \tag{4}$$

That is, the forward bias voltage Vf becomes a constant voltage irrespective of the current If. Therefore, the decreased sensitivity caused by the negative feedback effect, which becomes troublesome in the conventional technique, can be eliminated to realize a high-sensitivity thermal infrared detecting device.

Figure 14:
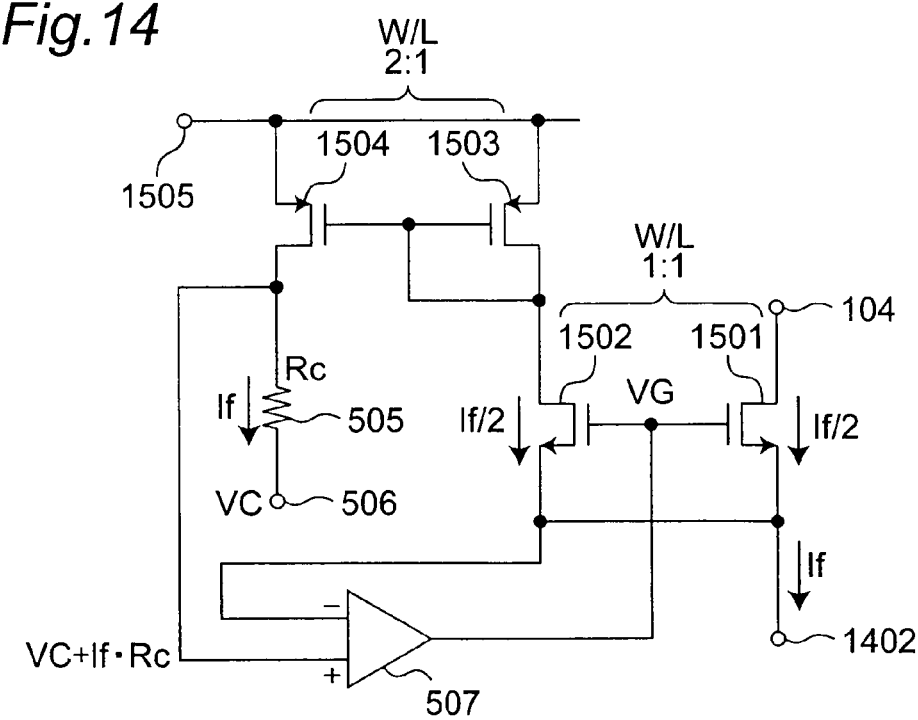
FIG. 14 is a circuit diagram showing a voltage setting circuit in the thermal infrared detecting device of the seventh embodiment.

FIG. 14 shows a configuration of the voltage setting circuit 1401. In the configuration of the voltage setting circuit 1401 in FIG. 14, the polarity of the transistor of the configuration shown in FIG. 4 is reversed, and the relationship between the power supply and the ground of the configuration shown in FIG. 4 is reversed. The current If of the diode 101 is supplied from NMOS transistors 1501 and 1502 whose sources are commonly connected. The operational amplifier 507 controls gate potentials of the NMOS transistors 1501 and 1502 such that source potentials of the NMOS transistors 1501 and 1502 become (Vc+If·Rc). The inverting input terminal of the operational amplifier 507 is connected to the sources of the NMOS transistors 1501 and 1502, and the non-inverting input terminal is connected to a drain of a PMOS transistor 1504.

A current mirror circuit including the PMOS transistors 1503 and 1504 is connected in series to the NMOS transistor 1502, and duplicates the diode current If. The potential of (Vc+If·Rc) which is produced using the duplicated current If and the resistor 505 is fed into the non-inverting input terminal of the operational amplifier 507. The resistor 505 has a resistance value equal to the combined resistance value of the interconnection resistances 102 and 103.

A basic operation of the voltage setting circuit 1401 of the present embodiment is identical to that of FIG. 4. However, when the forward current If is identical to that of FIG. 4, the current If/2 flows into the current read circuit 108 in the case of FIG. 4 while the current If flows into the current read circuit 108 in the case of FIG. 14. Therefore, the configuration shown in FIG. 14 can realize a thermal infrared detecting device having the better sensitivity. The terminal 506 is fixed to a fixed bias VC, and the current flows into the terminal 506. Thus it is necessary to prepare a power supply that has less change in voltage due to the flowing-into current, as a power supply for generating a fixed bias VC. In this embodiment, since the potential at the anode of the diode is controlled, it is necessary to keep always the potential at the cathode terminal 107 constant. Accordingly, preferably the circuit shown in FIG. 2A to keep always the input potential constant is applied to the current read circuit 108. In the present embodiment, the idea of the second embodiment can also be applied to cause the current equal to the diode current If minus the constant current Ib to flow in the current read circuit 108.

Eighth Embodiment

As described in the seventh embodiment, in the first embodiment (see FIG. 4), when If is the current flowing through the diode, the current flowing through the current read circuit 108 becomes a half and the sensitivity is decreased. In eighth and ninth embodiments, a configuration which solves the problem of the decreased sensitivity will be described.

Figure 15:
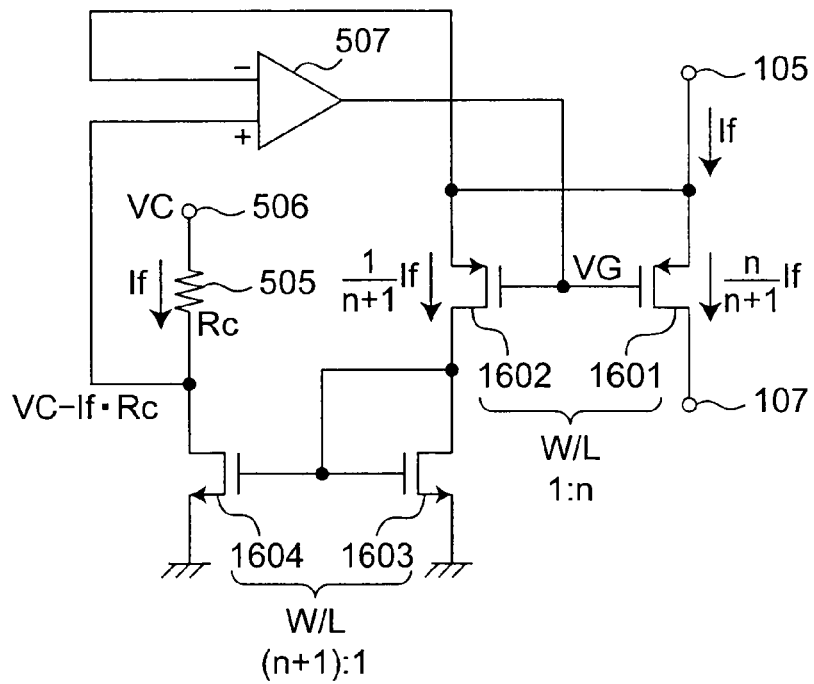
FIG. 15 is a circuit diagram showing a voltage setting circuit in a thermal infrared detecting device according to an eighth embodiment of the present invention.

FIG. 15 shows a configuration of a voltage setting circuit according to the present embodiment of the invention. The configuration of the present embodiment is same as that shown in FIG. 1 except for the voltage setting circuit. In the eighth embodiment, unlike the case of FIG. 4, a PMOS transistor 1601 and a PMOS transistor 1602 differ from each other in the W/L ratio. A W/L ratio of the PMOS transistor 1601 is set n (n>1) times a W/L ratio of the PMOS transistor 1602. Therefore, a W/L ratio of a NMOS transistor 1604 and a NMOS transistor 1603 is set at (n+1):1 in the current mirror circuit for duplicating the current. Accordingly, the current flowing in the current read circuit is increased by 2n/(n+1) times of the case of FIG. 4, and the sensitivity is also increased by the ratio of 2n/(n+1).

Ninth Embodiment

Figure 16:
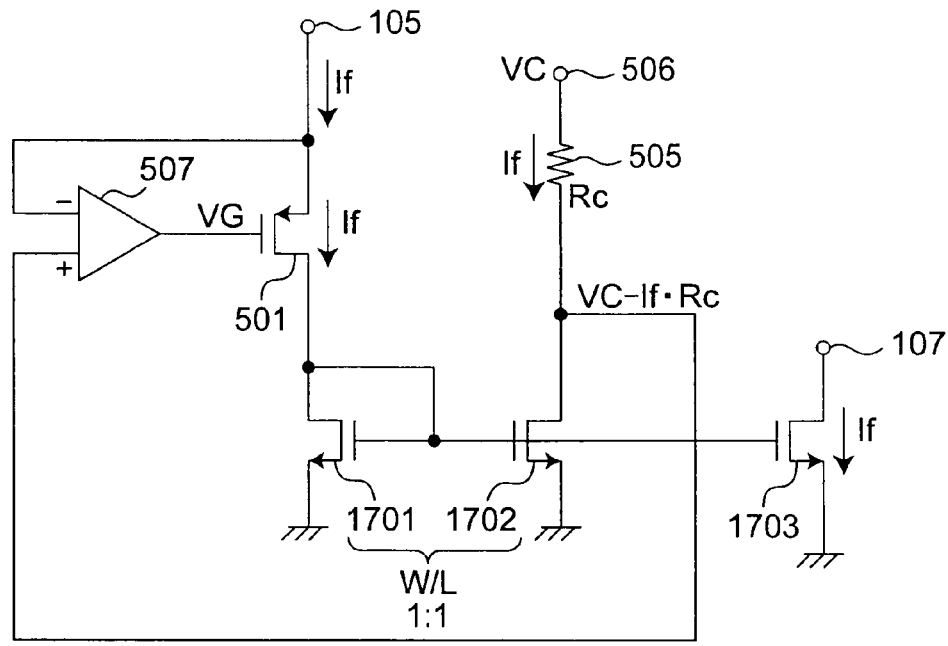
FIG. 16 is a circuit diagram showing a voltage setting circuit in a thermal infrared detecting device according to a ninth embodiment of the present invention.

FIG. 16 shows a configuration of a voltage setting circuit according to a ninth embodiment of the present invention. The configuration of the ninth embodiment is identical to that of FIG. 1 except for the voltage setting circuit. In the ninth embodiment, unlike the case of FIG. 4, an NMOS transistor 1701 whose gate and drain are connected is connected to the drain of the PMOS transistor 501. The source potential of the PMOS transistor 501 is controlled to (Vc−If·Rc) by the operational amplifier 507. The current If flowing through the PMOS transistor 501 is duplicated by NMOS transistors 1702 and 1703. The resistor 505 is connected between the drain of the NMOS transistor 1702 and the bias voltage Vc. The resistor 505 has the resistance value Rc which is match with the combined resistance value of the interconnection resistances 102 and 103. Hence, the drain voltage of the NMOS transistor 1702 is controlled to (Vc−If·Rc). The voltage of (Vc−If·Rc) is fed into the non-inverting input terminal of the operational amplifier 507. The current If flowing through the NMOS transistor 1703 is fed into the current read circuit 108 through the terminal 107, and the current If is read as an output signal. In the ninth embodiment, although the current If flowing through the diode 101 is not directly read, the current having the same amount as the current If can be taken out. That is, the current having the same amount as the current If of the diode 101 is flowing through the current read circuit 108, and thus the decreased sensitivity which becomes troublesome in the circuit configuration shown in FIG. 4 is not generated.

Tenth Embodiment

Figure 17:
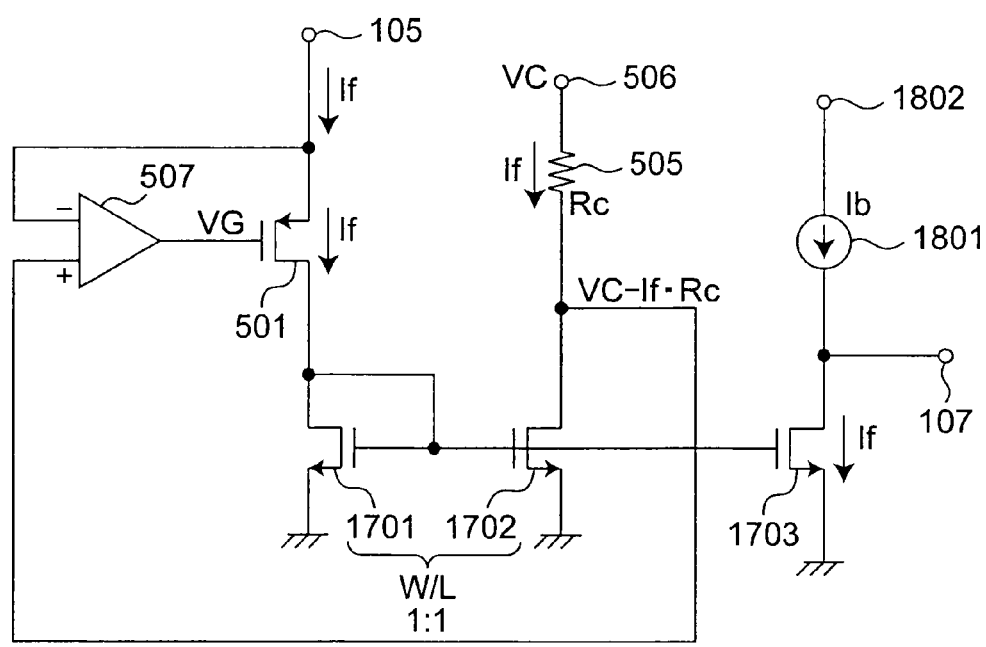
FIG. 17 is a circuit diagram showing a voltage setting circuit in a thermal infrared detecting device according to a tenth embodiment of the present invention.

FIG. 17 shows another configuration of the voltage setting circuit. The bias current Ib, as shown in FIG. 5, can be removed to supply only the differential current to the current read circuit 108 by the voltage setting circuit of the tenth embodiment. Referring to FIG. 17, a bias current source 1801 is connected in series to the NMOS transistor 1703. The method for setting the bias current Ib is identical to that of FIG. 5. As shown in FIGS. 8 and 9, the bias current value may be defined with the reference diode 901. According to the voltage setting circuit of the tenth embodiment, the current having the same amount as the current If of the diode 101 is flowing through the current read circuit 108, and thus a high-sensitivity thermal infrared detecting device can be realized.

Eleventh Embodiment

Figure 18:
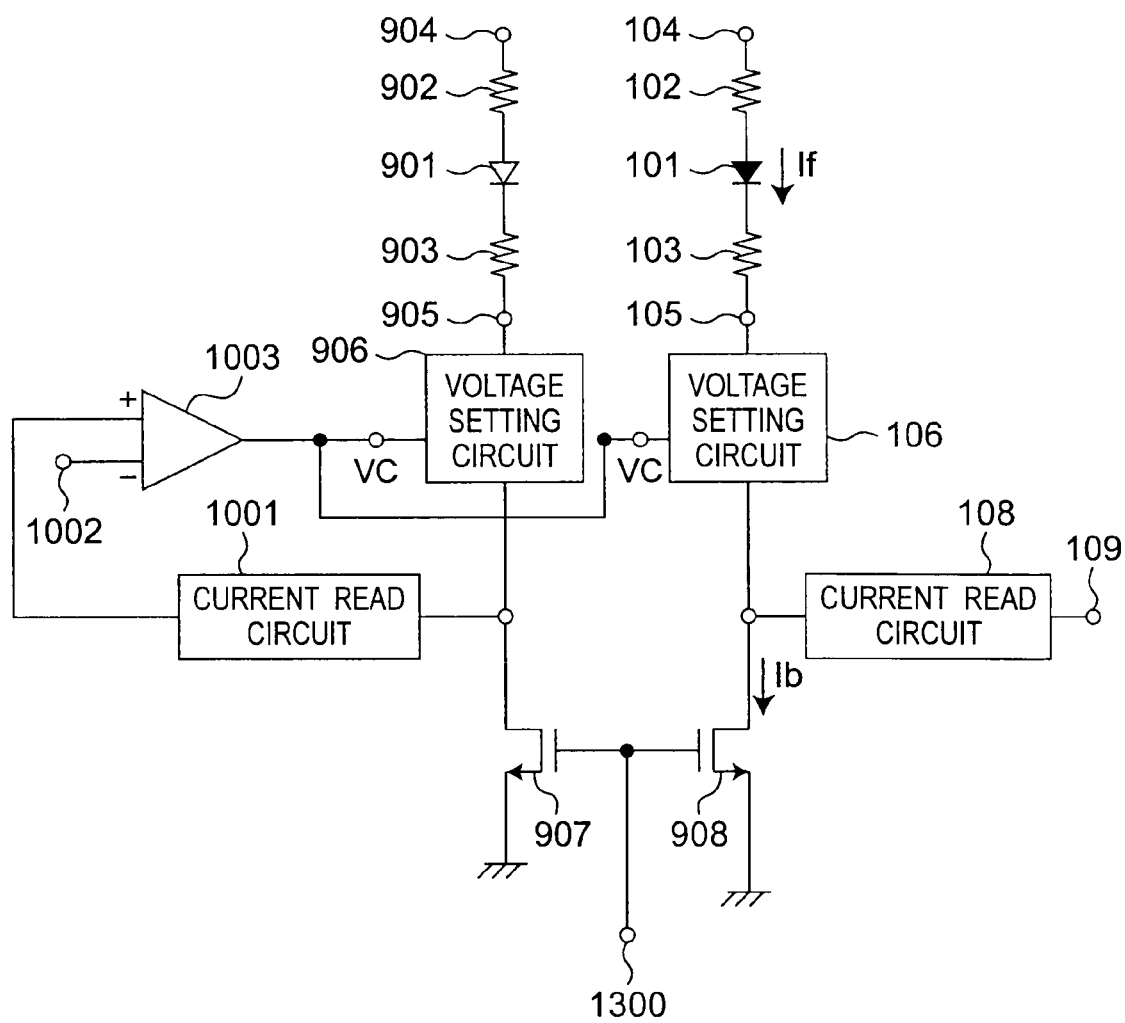
FIG. 18 is a circuit diagram showing a thermal infrared detecting device according to an eleventh embodiment of the present invention.

FIG. 18 shows configuration of a thermal infrared detecting device according to an eleventh embodiment of the present invention. In the configuration shown in FIG. 18, after the current defined by the NMOS transistor 907 is subtracted from the current of the reference diode 901, the current read circuit 1001 which is similar to the current read circuit 108 converts the subtracted current into the voltage. A predetermined bias voltage 1300 is applied to the gates of the NMOS transistors 907 and 908. The polarities of the output of the current read circuits 108 and 1001 are set such that the output voltage is increased with increasing input current. The output voltage of the current read circuit 1001 for the reference diode 901 is fed into the non-inverting input of the operational amplifier 1003, and the reference voltage is fed into the inverting input terminal 1002. The output of the operational amplifier 1003 is fed into the voltage VC input terminal (corresponding to voltage input terminal 506 shown in FIG. 4) of the second voltage setting circuit 906 and the voltage VC input terminal of the voltage setting circuit 106. Hence, the feedback loop is formed such that the output of the current read circuit 1001 is equal to the reference voltage (input voltage at the terminal 1002). In this manner, the VC input voltage at the second voltage setting circuit 906 and the VC input voltage at the voltage setting circuit 106 are defined such that the output voltage at the current read circuit 1001 for the reference diode 901 is equal to the reference voltage. In the case where the current read circuits 108 and 1001 have the reversal polarities, the polarity of the inputs of the operational amplifier 1003 can be reversed. In the eleventh embodiment, the subtraction of the current If is performed with the current source including the NMOS transistors 907 and 908. Alternatively, the configuration in which the subtraction is not performed using the current source may be adopted like the first embodiment.

In the eleventh embodiment, the correction including the temperature drifts of the circuits 906, 907, 108, and 1001 is performed. Further, the output relating to the reference diode 901 is always equal to the predetermined reference voltage so that the amount of current flowing through the reference diode 901 can be controlled to the constant current amount. Therefore, the temperature drift can be suppressed more accurately compared with the fourth embodiment.

Twelfth Embodiment

Figure 19:
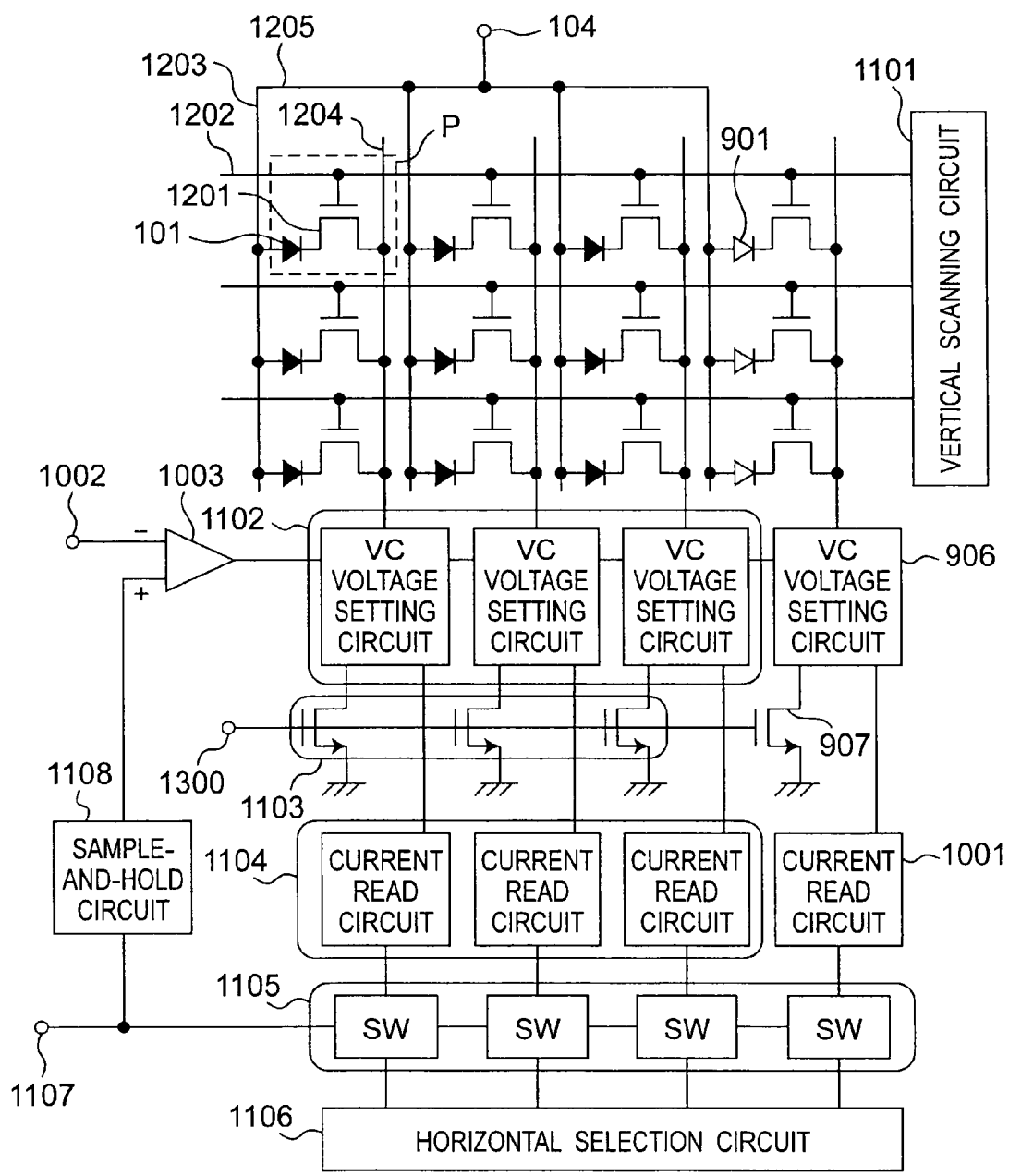
FIG. 19 is a circuit diagram showing a thermal infrared detecting device according to a twelfth embodiment of the present invention.

In a twelfth embodiment, the configuration of the eleventh embodiment is applied to a configuration of the thermal infrared detecting device in which the diodes are two-dimensionally arrayed. FIG. 19 shows such a configuration. This configuration can similarly be applied in other embodiments.

Referring to FIG. 19, the diodes 101 are arrayed to form the 3×3 pixel imaging device. The arrayed plural pixels P constitute a pixel array. The reference diode 901 is disposed at the right end of each row. The anodes of the diodes 101 and 901 are commonly connected in each row, and the vertical scanning circuit 1101 supplies the power supply voltage to each row from the power supply terminal 104. The cathodes of the diodes 101 and 901 are commonly connected in each column. The voltage setting circuit 1102 provided in each column is connected to the cathode of the diode 101, and the voltage setting circuit 906 is connected to the cathodes of the reference diode 901. The outputs of the voltage setting circuits 1102 and 906 are connected to the current sources 1103 and 907 and the current read circuits 1104 and 1001.

A predetermined bias voltage 1300 is fed into the gates of the current sources 1103 and 907 to make a constant current flow. The outputs of the current read circuits 1104 and 1001 are connected to the horizontal selection switch 1105. The horizontal selection switch 1105 is turned on by the control signal from the horizontal selection circuit 1106 to lead the outputs of the current read circuits 1104 and 1001 to the output terminal 1107.

When the output relating to the reference diode 901 is output, the sample-and-hold circuit 1108 samples and holds the output, and feeds the output into the non-inverting input terminal of the operational amplifier 1003. The reference voltage is fed into the inverting input terminal of the operational amplifier 1003 from the terminal 1002. The reference diode 901 is provided in each row. The input voltages to VC terminals of the voltage setting circuits 1102 and 906 are controlled such that the output of the reference diode 901 is equal to the reference voltage. A lowpass filter may be inserted in the output of the operational amplifier 1003. This allows the feedback effect generated by the output from the reference diode 901 to be averaged, resulting in the more stable output. Accordingly, a thermal infrared imaging device having high sensitivity and high dynamic range and being capable of suppressing temperature drift with high accuracy can be realized.

In the pixel P, the diode 101 and the selection MOS switch 1201 are connected in series. Specifically, the cathode of the diode 101 is connected to one of the terminals of the selection MOS switch 1201. The gates of the selection MOS switches 1201 are commonly connected in each row with the selection line 1202, and the vertical scanning circuit 1101 sequentially applies a row selection signal to the gates of the selection MOS switches 1201. The anodes of the diodes 101 are commonly connected in each column with the power supply line 1203, and the other terminal of each selection MOS switch 1201 is commonly connected in each column with the signal line 1204. The power supply lines 1203 are commonly connected between columns with the common power supply line 1205 and connected to the power supply terminal 104. The common power supply line 1205 is located outside the pixel array. Therefore even if the pixel size is reduced, the interconnection width can be set sufficiently wide to neglect the resistance contribution. In the pixel P, the row is selected by the selection MOS switch 1201, and thus the current component flowing in the row direction is eliminated unlike the fifth embodiment. When the power supply line 1203 is equalized to the signal line 1204 in width, the resistances of the power supply line 1203 and signal line 1204 become identical. Therefore, even if any row is selected, the resistance connected to the diode 101 includes the resistance (power supply line resistance) of the one signal line and the on-resistance of the selection MOS switch 1201 in addition to the resistance of the heat-insulated supporting leg (not shown). The same holds true for any pixel row. Not only the resistance becomes identical in all the pixels, but also only the current of the selected diode is flowing through the power supply line or signal line in the pixel. Therefore, the false signal is not generated. Accordingly, the difference in resistance between the pixels, caused by the diode array is not generated, and thus the false signal is not generated, providing a thermal infrared imaging device having high sensitivity and high dynamic range and being capable of suppressing temperature drift with high accuracy.

The array configuration in which the selection MOS switch 1201 is not formed in the pixel P can also be used as shown in the fifth embodiment.

In the present embodiment, not only the output corresponding to the reference diode 901 is always equal to the predetermined reference voltage, but also the amount of current flowing through the reference diode 901 can be controlled to the constant current amount. Therefore, the temperature drift can be suppressed more accurately compared with the fifth and sixth embodiments.

Thirteenth Embodiment

Figure 20:
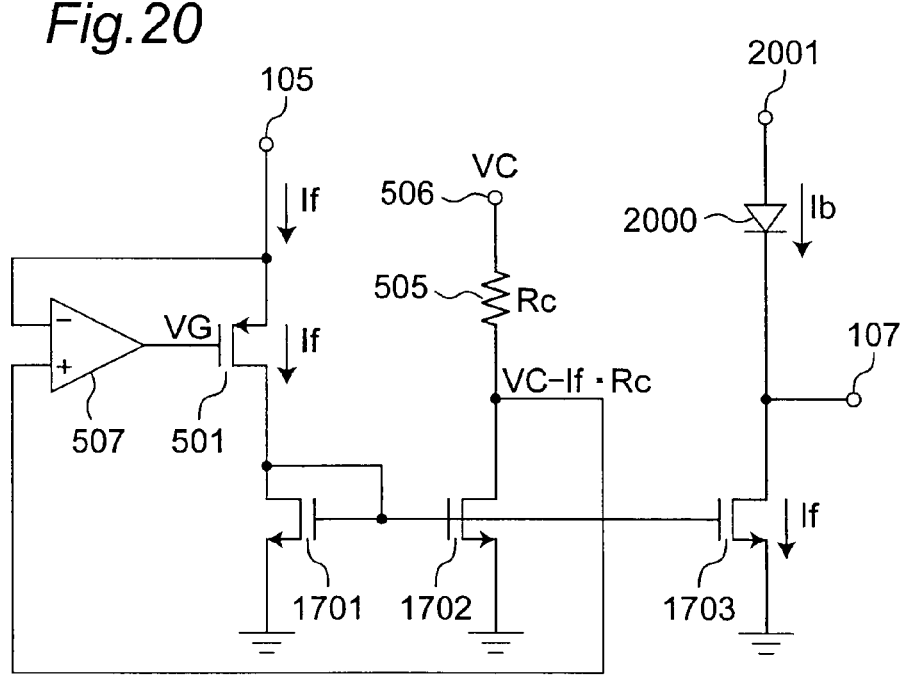
FIG. 20 is a circuit diagram showing a voltage setting circuit in a thermal infrared detecting device according to a thirteenth embodiment of the present invention.

FIG. 20 shows a configuration of a voltage setting circuit in a thermal infrared detecting device according to a thirteenth embodiment of the present invention. Referring to FIG. 20, according to the thirteenth embodiment, in the configuration of the tenth embodiment 10 (see FIG. 17), the voltage setting circuit uses a diode 2000 as the bias current source 1801. The diode 2000 is a reference diode does not have infrared absorption structure and/or heat-insulated structure, and a diode having no supporting leg structure. Hereinafter such a diode is referred to as "reference diode without supporting leg structure"). The thermal infrared detecting device of the thirteenth embodiment has the same configuration as that of FIG. 1 except for the voltage setting circuit. The reset integrator shown in FIG. 2B can be used as the current read circuit 108, and the voltage at the input terminal 107 of the current read circuit 108 is equal to the voltage VB at the non-inverting input terminal of the operational amplifier 301 shown in FIG. 2B.

A voltage at a terminal 2001 and the voltage at the terminal 107 are applied to the reference diode 2000 without supporting leg structure, the bias current Ib flows through the reference diode 2000 without supporting leg structure, and only the differential current (Ib−If) can be supplied to the subsequent current read circuit 108 through the terminal 107.

An area of the reference diode and the number of reference diodes may be equal to an area of the pixel diode and the number of pixel diodes, respectively, and further the voltages at the terminal 2001 and the voltage at the terminal 107 may be set such that the voltage equal to the voltage (Vdd−Vc) (see equation (2)) which is applied to the pixel diode may be applied to the reference diode 2000 without supporting leg structure. With this configuration, only the current increased in response to the infrared ray can be taken out as the differential current (Ib−If) fed into the current read circuit 108. Hence, a high-sensitivity thermal infrared detecting device having large dynamic range and small output fluctuation caused by the ambient temperature change, that is, small temperature drift can be realized. Further the structure in which a diode having a small differential resistance is provided in parallel to the NMOS transistor 1703 having the high differential resistance due to a saturation operation is provided. It enables connecting the voltage setting circuit to the input terminal of the subsequent current read circuit with low impedance. Therefore, the noise can be reduced and a high-performance thermal infrared detecting device can be realized. The reference diode having the supporting leg structure may be used as the reference diode 2000 without supporting leg structure.

Fourteenth Embodiment

Figure 21:
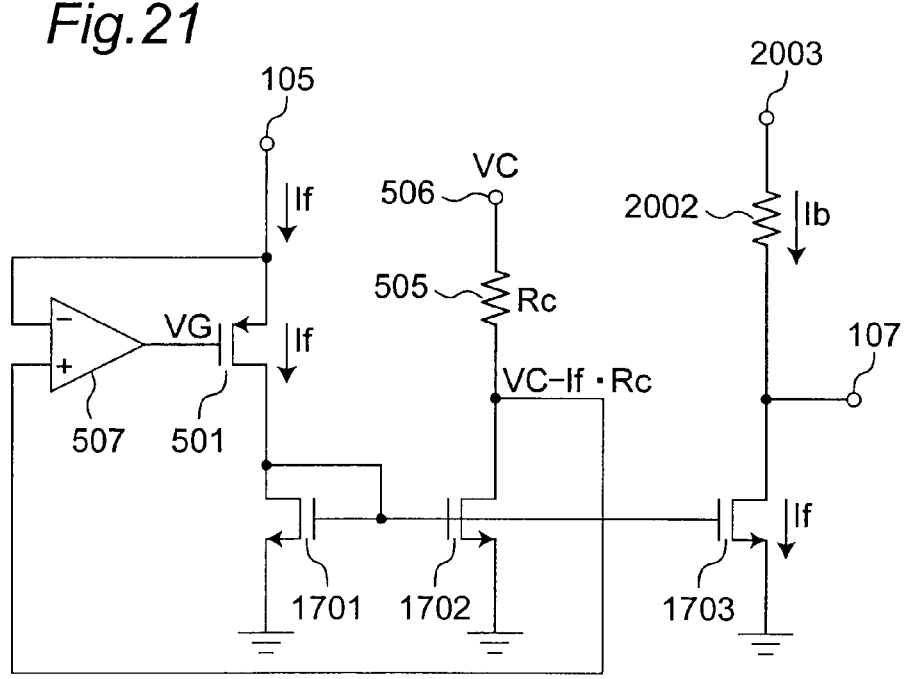
FIG. 21 is a circuit diagram showing a voltage setting circuit in a thermal infrared detecting device according to a fourteenth embodiment of the present invention.

FIG. 21 shows a configuration of a voltage setting circuit in a thermal infrared detecting device according to a fourteenth embodiment of the present invention. Referring to FIG. 21, according to the present embodiment, in the configuration of the tenth embodiment (see FIG. 17), the voltage setting circuit uses a resistive element 2002 as the bias current source 1801. The thermal infrared detecting device of the fourteenth embodiment has the same configuration as that of FIG. 1 except for the voltage setting circuit. The reset integrator shown in FIG. 2B can be used as the current read circuit 108, and the voltage at the input terminal 107 of the current read circuit 108 is equal to the voltage VB at the non-inverting input terminal of the operational amplifier 301 shown in FIG. 2B.

A voltage at a terminal 2003 and the voltage at the terminal 107 are applied across the resistive element 2002, allowing the bias current Ib to flow through the resistive element 2000 and only the differential current (Ib−If) to be supplied to the subsequent current read circuit 108. Accordingly, a high-sensitivity thermal infrared detecting device having large dynamic range and small output fluctuation caused by the ambient temperature change, that is, the small temperature drift can be realized. The resistive element 2002 has resistance value which is smaller than the differential resistance value of the NMOS transistor 1703 which is increased due to the saturation operation of the NMOS transistor. With this configuration, the voltage setting circuit can be connected to the input terminal 107 of the subsequent current read circuit 108 with low impedance, so that the noise can be reduced and a high-performance thermal infrared detecting device can be realized.

Fifteenth Embodiment

Figure 22:
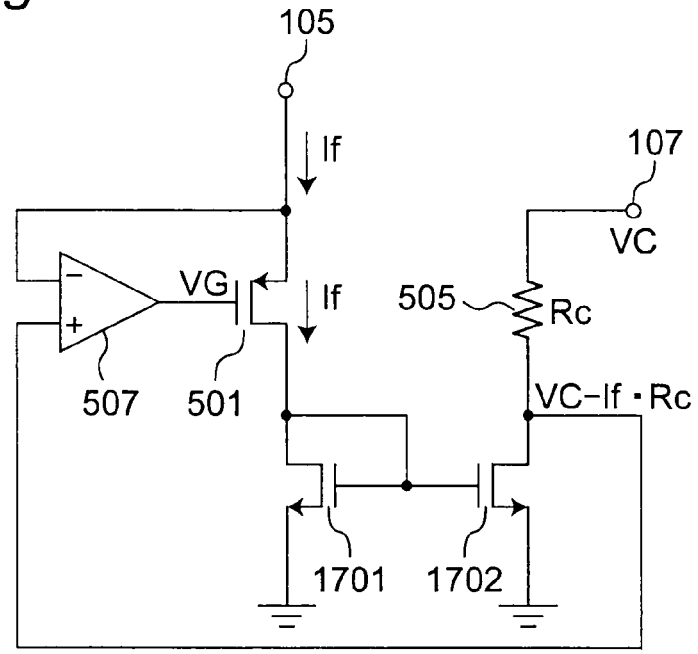
FIG. 22 is a circuit diagram showing a voltage setting circuit in a thermal infrared detecting device according to a fifteenth embodiment of the present invention.

FIG. 22 shows a configuration of a voltage setting circuit in a thermal infrared detecting device according to a fifteenth embodiment of the present invention. The thermal infrared detecting device of the fifteenth embodiment has the same configuration as that of FIG. 1 except for the voltage setting circuit.

In the fifteenth embodiment, the NMOS transistor 1701 of which gate and drain are connected is connected to the drain of the PMOS transistor 501. The source potential of the PMOS transistor 501 is controlled to (Vc−If·Rc) by the operational amplifier 507. The current If flowing through the NMOS transistor 1701 is duplicated by the NMOS transistor 1702. The resistor 505 is connected between the drain of the NMOS transistor 1702 and the terminal 107. The resistor 505 has the resistance value Rc which is equal to the combined resistance value of the interconnection resistances 102 and 103.

The reset integrator shown in FIG. 2B can be used as the current read circuit 108. The voltage at the input terminal 107 which serves as the input terminal of the current read circuit 108 is equal to the voltage (although designated with the notation of "VB" in FIG. 2B, designated with the notation of "VC" in FIG. 22) at the non-inverting input terminal of the operational amplifier 301 shown in FIG. 2B. Therefore, the drain voltage of the NMOS transistor 1702 is controlled to (Vc−If·Rc). The voltage of (Vc−If·Rc) is fed into the non-inverting input terminal of the operational amplifier 507. The current If flowing through the NMOS transistor 1702 is fed into the current read circuit 108 through the terminal 107, and the current If is read as an output signal.

In the fifteenth embodiment, although the current If flowing through the diode 101 is not directly read, the current having the same amount as the current If can be taken out. That is, the current having the same magnitude as the current If of the diode 101 flows through the current read circuit 108, and thus the decreased sensitivity which becomes troublesome in the circuit configuration shown in FIG. 4 is not generated. Additionally, the NMOS transistor 1703 is not required unlike the configuration of the tenth embodiment. Accordingly, the circuit area is reduced, and the chip area of the thermal infrared detecting device is reduced, so that the cost is reduced compared with the tenth embodiment.

Sixteenth Embodiment

Figure 23:
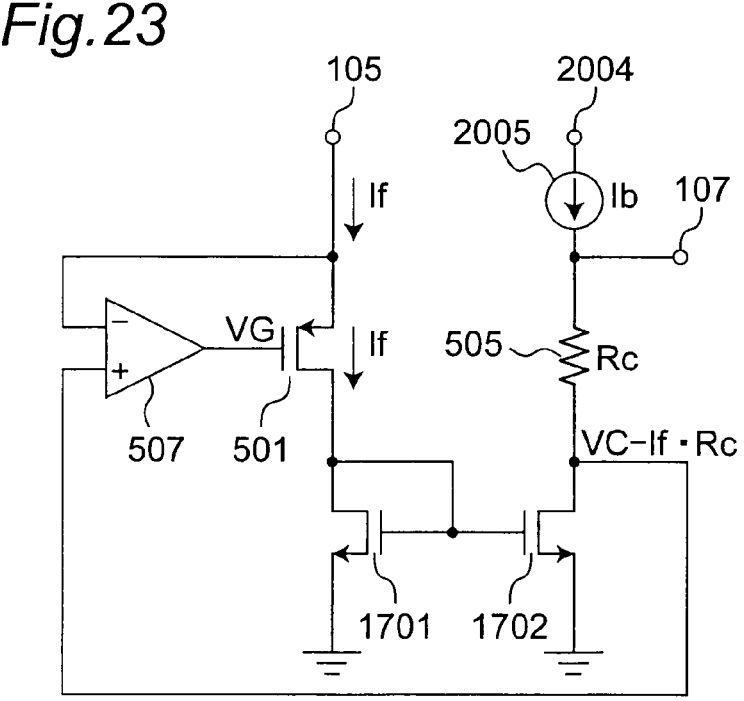
FIG. 23 is a circuit diagram showing a voltage setting circuit in a thermal infrared detecting device according to a sixteenth embodiment of the present invention.

FIG. 23 shows a configuration of a voltage setting circuit in a thermal infrared detecting device according to a sixteenth embodiment of the present invention. The voltage setting circuit of the sixteenth embodiment has a bias current source 2005 in addition to the configuration shown in FIG. 22. The differential current between the current IF and the current Ib flowing from the bias current source 2005 is fed into the terminal 107 to be read out. In this manner, a high-sensitivity thermal infrared detecting device having large dynamic range and small output fluctuation caused by the ambient temperature change, that is, small temperature drift can be realized.

Figure 24:
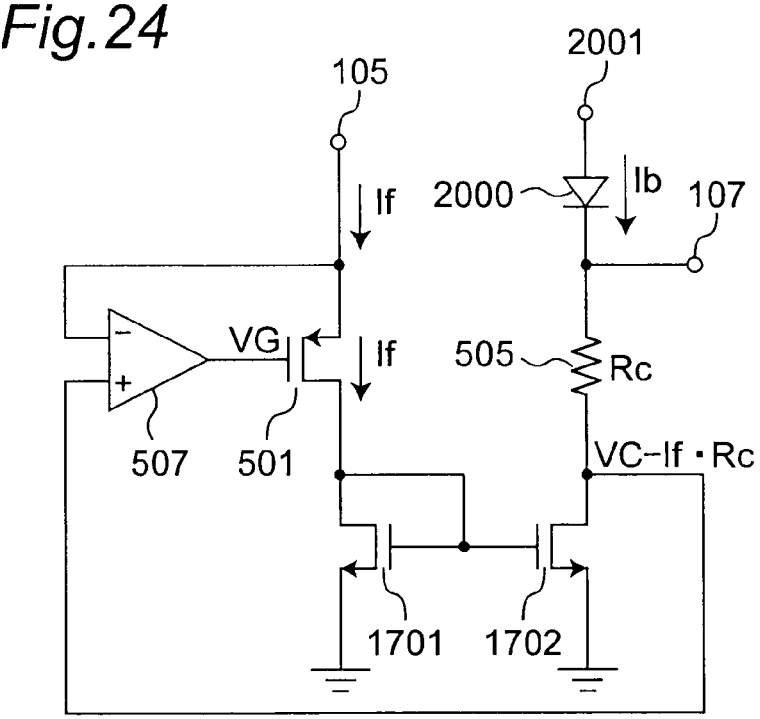
FIG. 24 is a circuit diagram showing a variation of the voltage setting circuit in the thermal infrared detecting device of the sixteenth embodiment of the present invention.
Figure 25:
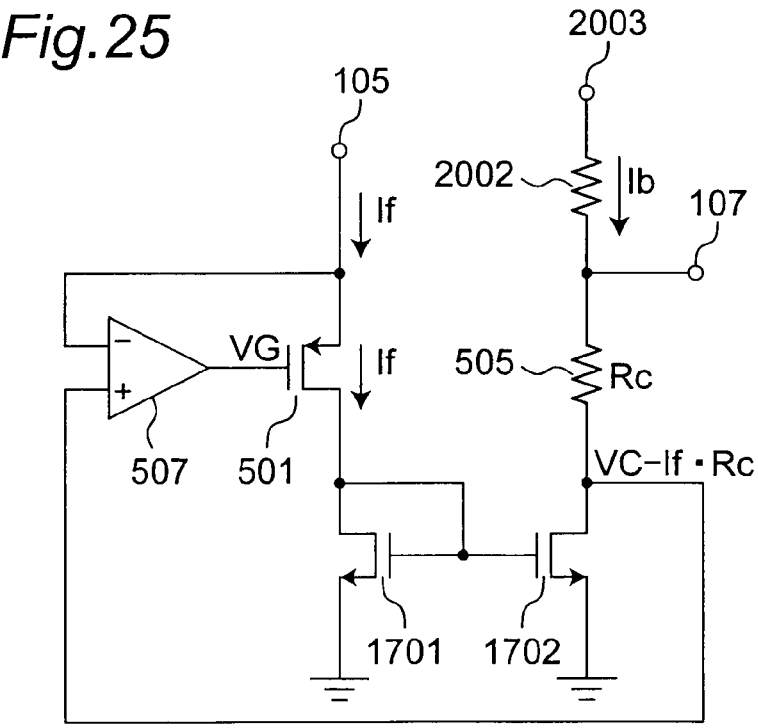
FIG. 25 is a circuit diagram showing another modification of the voltage setting circuit in the thermal infrared detecting device of the sixteenth embodiment of the present invention.

A current-mirror current source using a MOS transistor can be used as the bias current source 2005. Alternatively, the reference diode (see FIG. 24) without supporting leg structure of the thirteenth embodiment and the resistive element (see FIG. 25) shown in the fourteenth embodiment can be used as the bias current source 2005.

Seventeenth Embodiment

Figure 26:
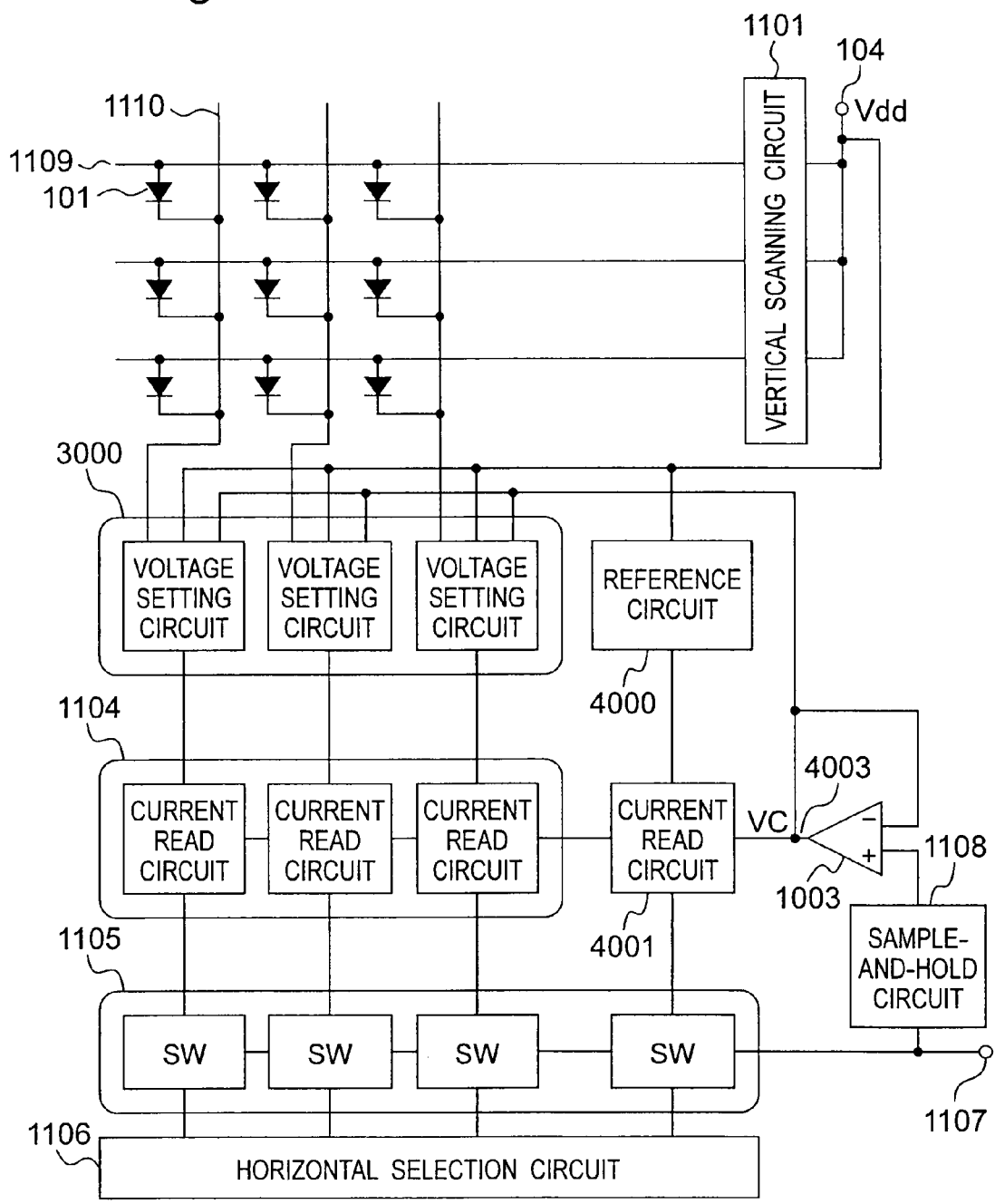
FIG. 26 is a circuit diagram showing a thermal infrared detecting device according to a seventeenth embodiment of the present invention.

In a seventeenth embodiment, the voltage setting circuit shown in the thirteenth embodiment (see FIG. 20) is applied to the configuration of the thermal infrared detecting device in which the diodes are two-dimensionally arrayed. FIG. 26 shows a configuration of a thermal infrared detecting device of the seventeenth embodiment.

Figure 27:
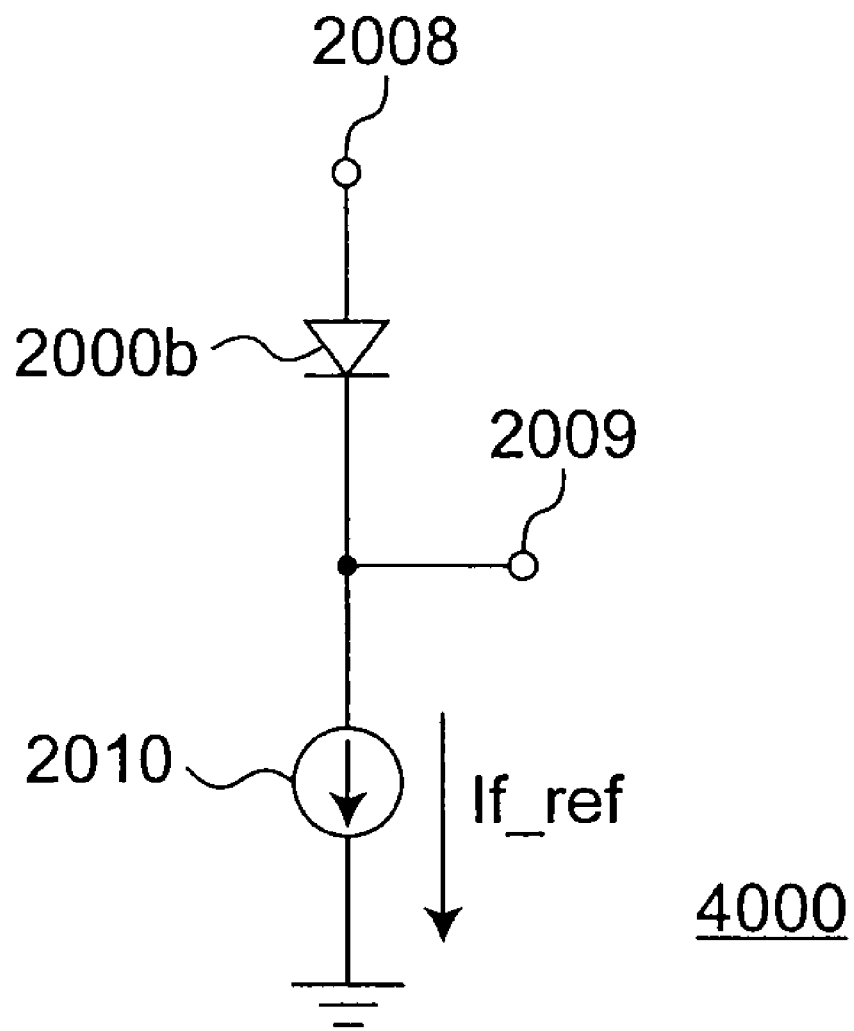
FIG. 27 is a circuit diagram showing a reference circuit in the thermal infrared detecting device of the seventeenth embodiment of the present invention.

In the configuration shown in FIG. 26, the diodes 101 are arrayed to form the 3×3 pixel imaging device. The arrayed plural pixels constitute a pixel array. The anodes of the diodes 101 are commonly connected in each row, and the anodes are connected to the vertical scanning circuit 1101. The vertical scanning circuit 1101 sequentially supplies the power supply voltage Vdd to the diodes 101 in each row from the power supply terminal 104. The cathodes of the diodes 101 are commonly connected in each column. A voltage setting circuit 3000 provided in each column is connected to the cathode of the diode 101. The voltage setting circuit 3000 has the configuration shown in the thirteenth embodiment. A reference circuit 4000 is added to the right end of the voltage setting circuit 3000 provided in each column. The reference circuit 4000 is not connected to the pixel array. FIG. 27 shows a specific configuration of the reference circuit 4000. The reference circuit 4000 includes a reference diode 2000b which does not have a differential current generating supporting leg structure and a current source 2010 drawing a current If_ref.

The voltage setting circuit 3000 has a configuration shown in FIG. 20. Referring to FIG. 20, the terminal 105 of the voltage setting circuit 3000 is connected to the cathode of the pixel diode, the terminal 107 is connected to the current read circuit 1104, the terminal 506 is connected to the output of the operational amplifier 1003, and the terminal 2001 is connected to the terminal 104 providing the power supply voltage Vdd.

The outputs of the voltage setting circuit 3000 and reference circuit 4000 are connected to the current read circuit 1104 and a current read circuit 4001, respectively. The outputs of the current read circuits 1104 and 4001 are connected to the horizontal selection switch 1105. The horizontal selection switch 1105 is turned on by the control signal supplied from the horizontal selection circuit 1106 to lead the outputs of the current read circuits 1104 and 4001 to the output terminal 1107. In the seventeenth embodiment, the current read circuits 1104 and 4001 have the configuration shown in FIG. 2B.

When the output relating to the reference circuit 4000 is supplied, the sample-and-hold circuit 1108 samples and holds and then feeds the output into the non-inverting input terminal of the operational amplifier 1003. An output voltage 4003 of the operational amplifier 1003 is fed into the inverting input terminal of the operational amplifier 1003. The output voltage 4003 of the operational amplifier 1003 is fed as a voltage VC into the VC voltage (terminal 506 shown in FIG. 20) of the voltage setting circuit 3000. The output voltage 4003 of the operational amplifier 1003 is also fed into the non-inverting input terminals (terminal VB in FIG. 2B) of the operational amplifiers (operational amplifier 301 shown in FIG. 2B) of the current read circuits 1104 and 4001. The anode terminal 2008 of the reference diode 2000b which does not have the differential current generating supporting leg structure in the reference circuit 4000 is connected to the power supply voltage Vdd of the terminal 104.

In the configuration shown in FIG. 26, the output voltage 4003 (that is, bias voltage VC) of the operational amplifier 1003 is controlled such that the current flowing through the reference diode 2000b in the reference circuit 4000 becomes equal to the current If_ref of the reference current source 2010 of the reference circuit 4000 (that is, the current fed into the current read circuit 4001 from the reference circuit 4000 through the output terminal 2009 becomes zero), and such that the output of the current read circuit 4001 becomes equal to the voltage VC of the non-inverting input terminal of the operational amplifier (for example, operational amplifier 301 shown in FIG. 2B) of the current read circuit 4001.

In the seventeenth embodiment, the bias voltage VC is controlled such that, even if ambient temperature is changed, the current flowing through the reference diode 2000b in the reference circuit 4000 is always equal to the current If_ref of the reference current source 2010. The voltage Vdd−VC is applied to the reference diodes 2000 and 2000b, and is equal to the voltage applied to the pixel diode 101. When no infrared ray is incident to the thermal infrared detecting device, the current If_ref is flowing through the pixel diode 101 irrespective of ambient temperature by setting the bias voltage VC. Therefore, irrespective of ambient temperature, the current of the pixel diode can be measured based on the current If_ref as reference current. Finally, out of the current of the pixel diode measured based on a predetermined reference irrespective of ambient temperature, only the current fraction increased due to the incident infrared ray can be read with the current read circuit 1104. Accordingly, a thermal infrared detecting device having high sensitivity and high dynamic range and capable of suppressing temperature drift with high accuracy can be realized.

In the present embodiment, the voltage Vdd is a constant voltage while the voltage VC is controlled by the feedback. Alternatively, the voltage VC is a constant voltage while the voltage Vdd is controlled by the feedback. In the present embodiment, although the configuration of thirteenth embodiment is applied, the configuration of sixteenth embodiment shown in FIG. 24 may be applied.

A low pass filter may be inserted in the output of the operational amplifier 1003. Then, the feedback effect generated by the output from the reference circuit 4000 can be averaged to obtain a more stable output. Accordingly, the thermal infrared imaging device having the high sensitivity and the high dynamic range can be realized while the temperature drift is suppressed with high accuracy.

Eighteenth Embodiment

Figure 28:
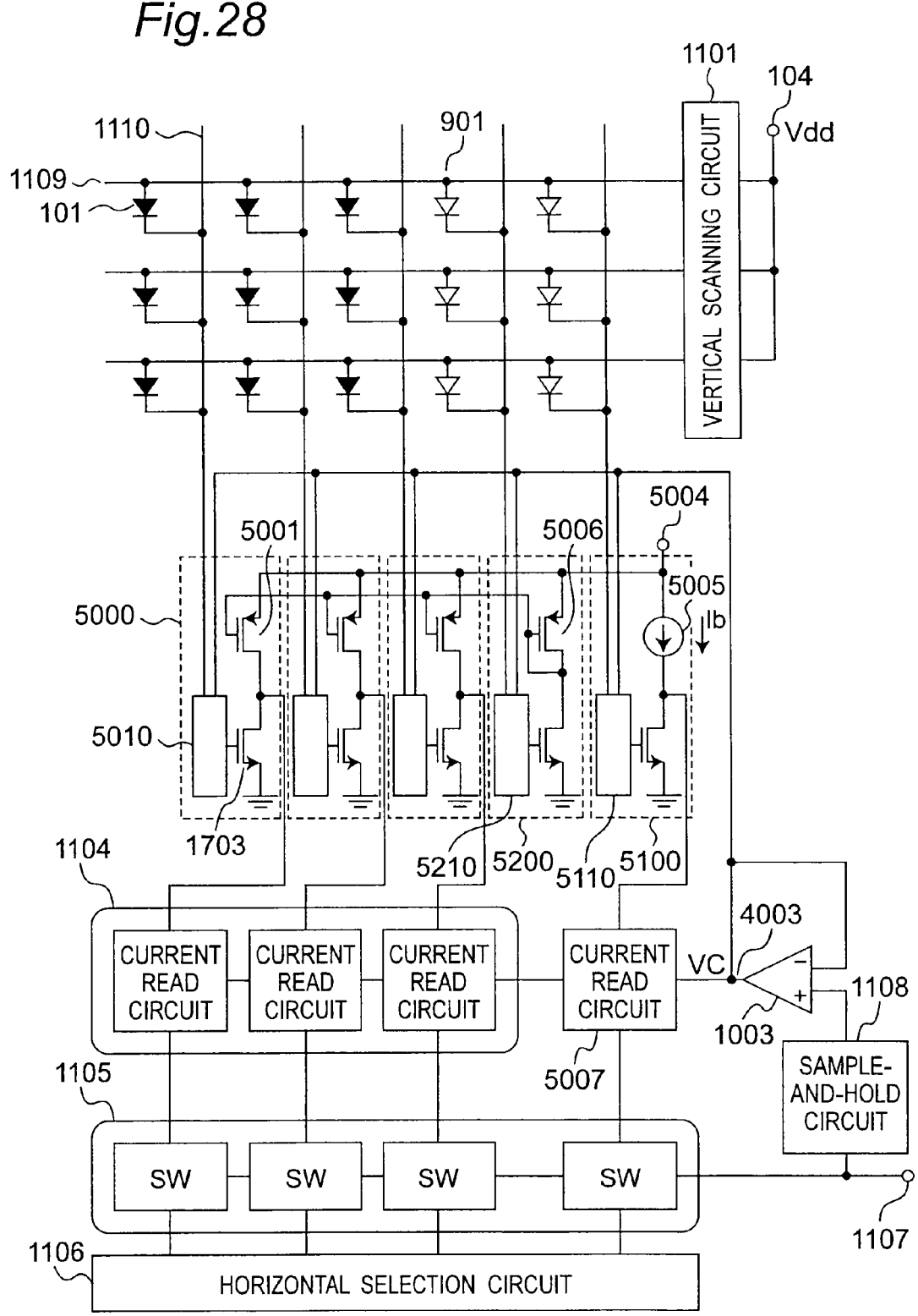
FIG. 28 is a circuit diagram showing a thermal infrared detecting device according to an eighteenth embodiment of the present invention.

In an eighteenth embodiment, the voltage setting circuit in which a current-mirror current source formed by the PMOS transistor is used as the bias current source 1801 in the configuration of the tenth embodiment is applied to the configuration of the thermal infrared detecting device in which the diodes are two-dimensionally arrayed. FIG. 28 shows a thermal infrared detecting device of the eighteenth embodiment.

Referring to FIG. 28, the diodes 101 are arrayed to form the 3×3 pixel imaging device. The arrayed plural pixels constitute a pixel array. The diodes (reference diodes) 901 which do not have the infrared absorption structure and/or the heat-insulated structure are formed in two columns at the right end of each row. The anodes of the diodes 101 and 901 are commonly connected in each row. The vertical scanning circuit 1101 sequentially supplies the power supply voltage Vdd to the anodes of the diodes 101 and 901 in each row from the power supply terminal 104. The cathodes of the diodes 101 and 901 are commonly connected in each column. A voltage setting circuit 5000 provided in each column is connected to the cathodes of the diodes 101 and 901.

Figure 29:
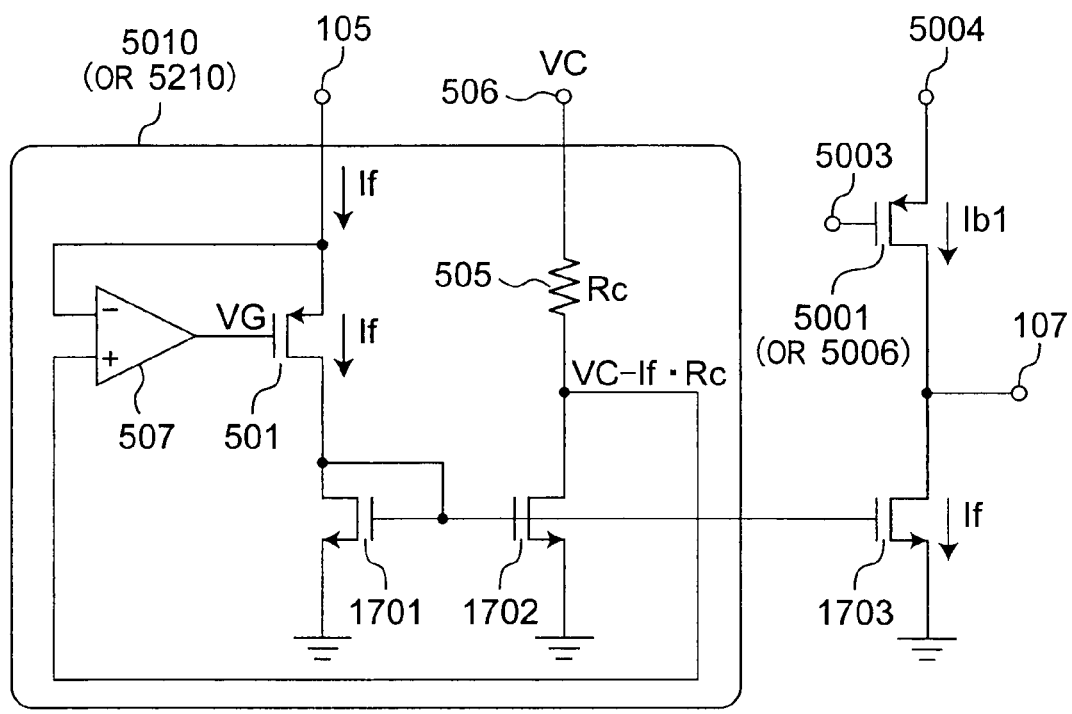
FIG. 29 is a circuit diagram showing a voltage setting circuit in the thermal infrared detecting device of the eighteenth embodiment of the present invention.

The voltage setting circuit 5000 has the configuration (see FIG. 17) of the tenth embodiment with the bias current source 1801 composed of a current-mirror current source including a PMOS transistor 5001. FIG. 29 shows a configuration of the voltage setting circuit 5000. Referring to FIG. 29, the terminal 105 is connected to the pixel diode, the terminal 107 is connected to the current read circuit 1104, and the terminal 506 is connected to the output of the operational amplifier 1003. A terminal 5003 is connected to the gate of other PMOS transistor 5001 and the gate of PMOS transistor 5006.

A voltage setting circuit 5200 which is connected to the reference pixel and located at the second column from the right end has the configuration similar to that of FIG. 29. In the voltage setting circuit 5200, the gate electrode and drain electrode of the PMOS transistor 5006 are connected, enabling the current mirror operation with the PMOS transistor 5006 and the PMOS transistor 5001. A current Ib1 which is equal to the current flowing through the reference diode 901 located at the second column from the right end flows through the PMOS transistor 5001 in the voltage setting circuit 5000 connected to each column of the pixel array. In the voltage setting circuit 5000, the differential current between the current If flowing through the pixel diode 101 in each column of the pixel array and the current Ib1 flowing through the reference diode 901 is supplied to the subsequent current read circuit 1104. Therefore, only the increment of the pixel diode current increased due to the incident infrared ray can be read with the current read circuit 1104.

The output of the current read circuits 1104 and 5007 are connected to the horizontal selection switch 1105. The horizontal selection switch 1105 is sequentially turned on by the control signal from the horizontal selection circuit 1106 to lead the outputs of the current read circuits 1104 and 5007 to the output terminal 1107. When the output relating to the reference diode located at the right end of the columns is supplied, the sample-and-hold circuit 1108 samples and holds the output, and feeds the output into the non-inverting input terminal of the operational amplifier 1003. The output voltage 4003 of the operational amplifier 1003 is fed into the inverting input terminal of the operational amplifier 1003. The output voltage 4003 of the operational amplifier 1003 is fed, as voltage VC, into the VC voltage (terminal 506 shown in FIG. 29) of the voltage setting circuit 5000. The output voltage 4003 of the operational amplifier 1003 is also fed into the non-inverting input terminal (terminal VB in FIG. 2B) of the operational amplifiers of the current read circuits 1104 and 5007.

Not the PMOS transistor 5001 or 5006 but the bias current source 5005 for supplying the reference current Ib is connected to a voltage setting circuit 5100 corresponding to the reference diode located at the right end of the columns. A circuit 5110 in the voltage setting circuit 5100 has the configuration similar to a circuit 5010 shown in FIG. 29. The output of the voltage setting circuit 5000 corresponding to each column of the pixel diodes 101 is connected to the current read circuit 1104. The output of the voltage setting circuit 5200 corresponding to the reference diode located at the second column from the right end is not connected to the current read circuit 1104. The output of the voltage setting circuit 5100 corresponding to the reference diode located at the right end is connected to the current read circuit 5007. According to the configuration shown in FIG. 28, the output voltage 4003 of the operational amplifier 1003 is controlled such that the current flowing through the reference diode located at the right end of the columns becomes equal to the current Ib of the reference-current bias current source 5005 (that is, the current fed into the current read circuit 5007 becomes zero), and such that the output relating to the current read circuit 5007 becomes equal to the voltage VC of the non-inverting input terminal of the operational amplifier of the current read circuit 5007.

A lowpass filter may be inserted in the output of the operational amplifier 1003. With this configuration, the feedback effect generated by the output from the reference diode 5007 can be averaged, resulting in the more stable output.

According to the present embodiment, even if ambient temperature is changed, the current flowing through the reference diode located at the right end is always equal to the current Ib of the reference-current bias current source 5005. Additionally, as described above, only the contribution by the increment of the pixel diode current increased by the incident infrared ray is fed into the current read circuit. Therefore, a thermal infrared imaging device having high sensitivity and high dynamic range and capable of suppressing temperature drift with high accuracy can be realized.

Nineteenth Embodiment

Figure 30:
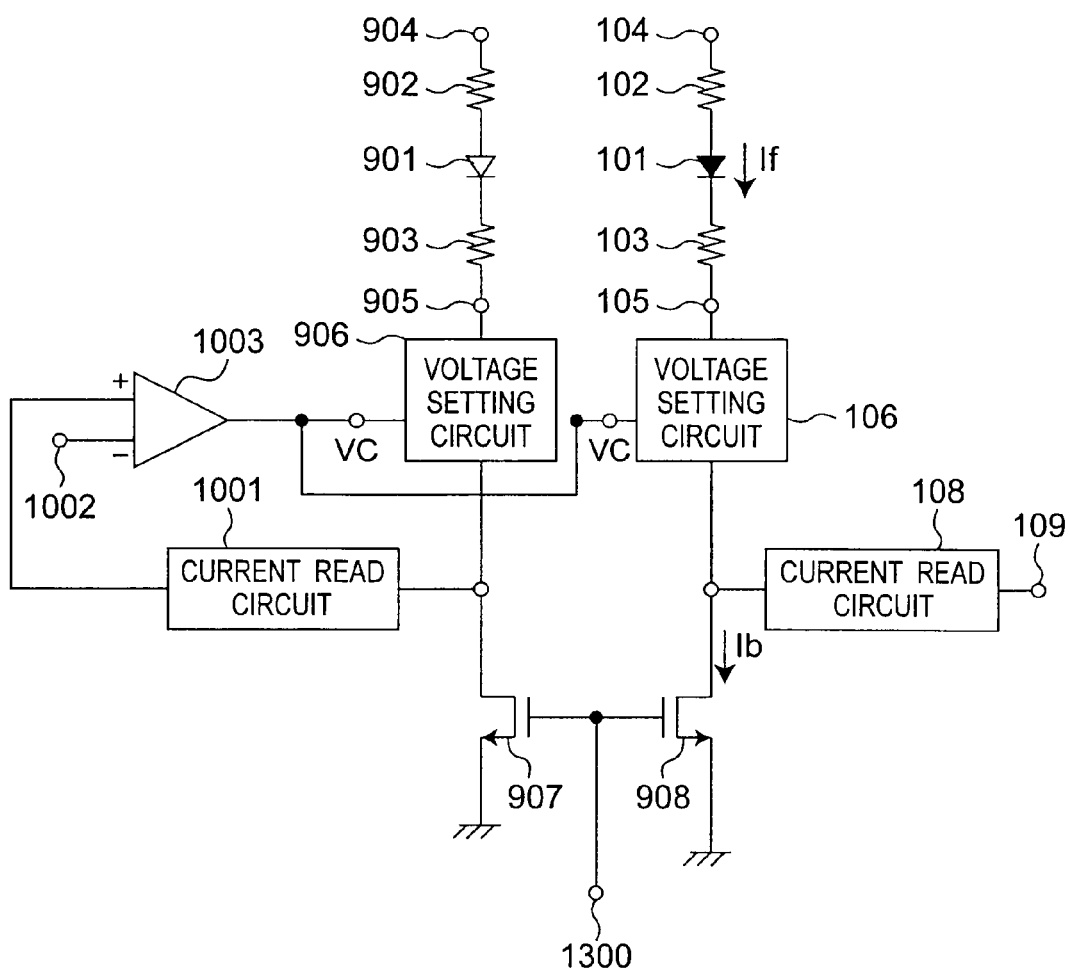
FIG. 30 is a circuit diagram showing a thermal infrared detecting device of a nineteenth embodiment of the present invention (configuration for a single pixel).

The present embodiment shows another embodiment of a thermal infrared imaging device capable of suppressing temperature drift. FIG. 30 shows a configuration of the thermal infrared imaging device of the present embodiment. Referring to FIG. 30, an anode of the reference diode 901 is connected through a resistor 902 to a power supply terminal 904. Usually the same power supply voltage as the power supply terminal 104 is supplied to the power supply terminal 904. A cathode of the reference diode 901 is connected to a voltage setting circuit 906 through a resistor 903 and a terminal 905. The resistors 902 and 903 and the voltage setting circuit 906 are identical to the resistors 102 and 103 and the voltage setting circuit 106, respectively. Because the reference diode 901 does not have the infrared absorption structure and/or the heat-insulated structure, the reference diode 901 does not response to the infrared ray, but flow the current through the reference diode 901 according to the ambient temperature change. The current of the reference diode 901 is also subtracted the current determined by the NMOS transistor 907, and then is converted into a voltage by a current read circuit 1001 which is similar to the current read circuit 108. A predetermined bias voltage 1300 is applied to the gates of the NMOS transistors 907 and 908. The polarity of output of the current read circuits 108 and 1001 are set such that the output voltage is increased with increasing input current. The output voltage of the current read circuit 1001 for the reference diode 901 is fed into the non-inverting input of the operational amplifier 1003, and the reference voltage is fed into the inverting input terminal 1002. The output of the operational amplifier 1003 is fed into the voltage VC input terminal (corresponding to voltage input terminal 506 shown in FIG. 4) of the second voltage setting circuit 906 and the voltage VC input terminal of the voltage setting circuit 106. Thus, the feedback loop is formed such that the output of the current read circuit 1001 is equal to the reference voltage (input voltage at the terminal 1002). In this manner, the VC input voltage at the second voltage setting circuit 906 and the VC input voltage at the voltage setting circuit 106 are determined such that the output voltage at the current read circuit 1001 for the reference diode 901 is equal to the reference voltage. With this configuration, the correction including the temperature drifts of the circuits 906, 907, 108, and 1001 is performed, the output relating to the reference diode 901 is always equal to the constant reference voltage, and further the amount of current flowing through the reference diode 901 can be controlled to the constant current amount. As a result, the temperature drift can be suppressed with high accuracy.

Twentieth Embodiment

Figure 31:
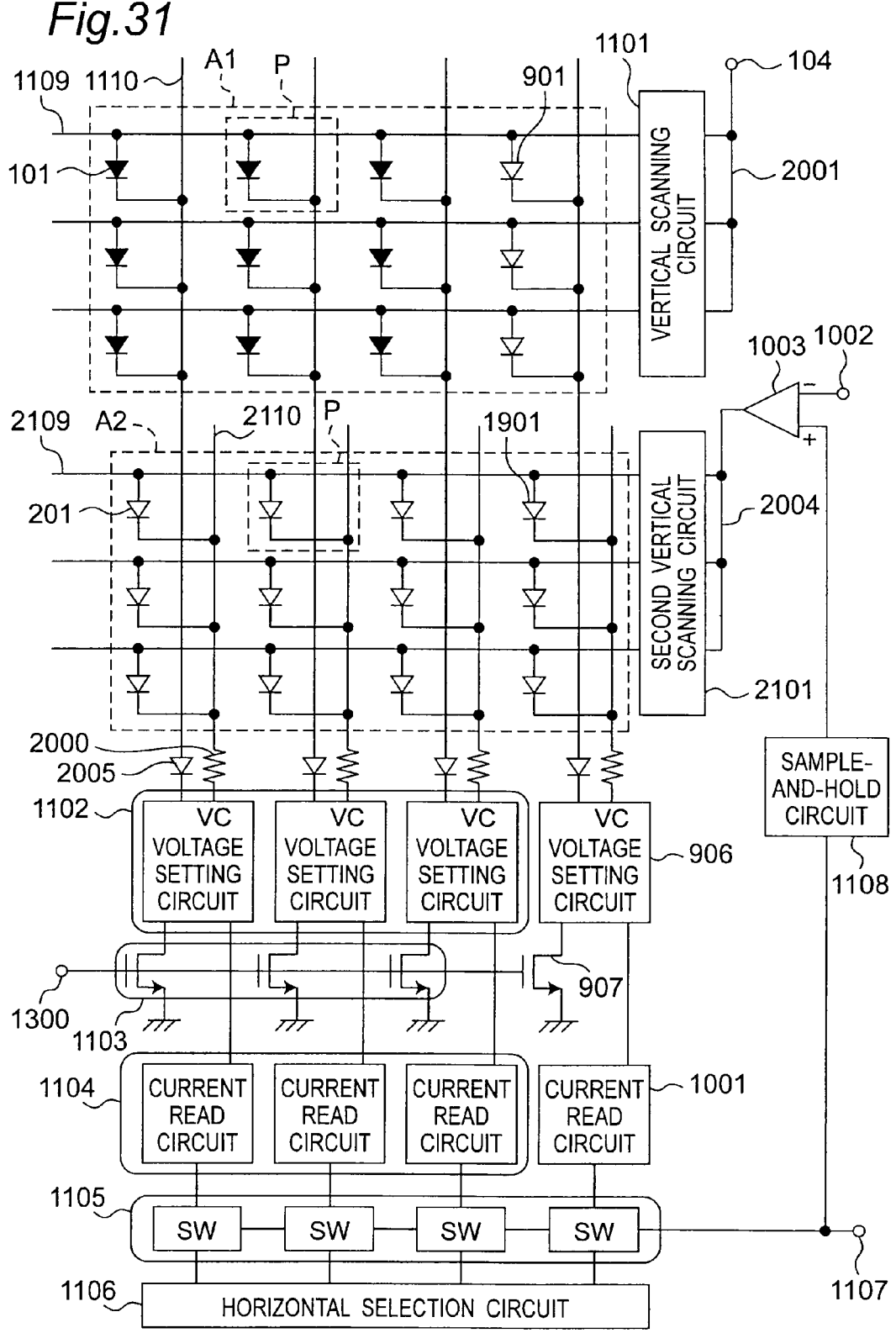
FIG. 31 is a circuit diagram showing a thermal infrared detecting device of a twentieth embodiment of the present invention (array configuration).

Referring to FIG. 31, the configuration shown in FIG. 30 is applied to a thermal infrared detecting device in which the diodes are two-dimensionally arrayed.

As shown in FIG. 31, in the pixel P, a dummy diode array A2 is formed along with a pixel array A1. The pixel array A1 includes infrared detecting diodes 101 and reference diodes 901. The dummy diode array A2 includes dummy diodes 201 and reference diodes 1901. The numbers of dummy diodes 201 and reference diodes 1901 are equal to the numbers of those in the pixel array. Similarly to the reference diode 901, the dummy diode 201 is formed by a diode which does not have infrared absorption structure and/or heat-insulated structure.

Referring to FIG. 31, the diodes 101 are arrayed to form a 3×3 pixel imaging device. The arrayed plural pixels constitute the pixel array A1. The reference diode 901 is disposed at a right end of each row. The anodes of the diodes 101 and 901 are commonly connected in each row with a drive line 1109. A vertical scanning circuit 1101 selects the diodes in each row, and supplies the power supply voltage Vdd from the power supply terminal 104. The cathodes of the diodes 101 and 901 are commonly connected in each column with a signal line 1110. The cathode of the diode 101 is connected to a voltage setting circuit 1102 provided in each column through a voltage drop compensation diode 2005. The voltage drop compensation diode 2005 is formed by a diode having the same structure as the dummy diode 201, that is, a diode which does not have infrared absorption structure and/or heat-insulated structure. The outputs of the voltage setting circuits 1102 and 906 are connected to the current sources 1103 and 907 and the current read circuits 1104 and 1001.

The dummy diodes 201 are arrayed to form a 4×3 pixel imaging device. The anodes of the dummy diodes 201 are commonly connected in each row with a drive line 2109, and are controlled by a second vertical scanning circuit 2101 sequentially in each row. The cathodes of the dummy diodes 201 are commonly connected in each column with an interconnection 2110. The cathode of the diode 201 is connected to the VC terminal of the voltage setting circuit 1102 provided in each column.

A predetermined bias voltage 1300 is fed into the gates of the current sources 1103 and 907 for flowing a constant current. The outputs of the current read circuits 1104 and 1001 are connected to the horizontal selection switches 1105. The horizontal selection switches 1005 are sequentially turned on by the control signal from the horizontal selection circuit 1106 to lead the outputs of the current read circuits 1104 and 1001 to the output terminal 1107.

When the output relating to the reference diode 901 is supplied, a sample-and-hold circuit 1108 samples and holds the output, and feeds the output into the non-inverting input terminal of the operational amplifier 1003. The reference voltage is fed into the inverting input terminal of the operational amplifier 1003 from the terminal 1002. Because the reference diodes 901 are provided in each row, the input voltage to a second vertical scanning circuit 2101 is controlled such that the output of the reference diode 901 is equal to the reference voltage. A lowpass filter may be inserted at the output of the operational amplifier 1003. In this manner, the feedback effect generated by the output from the reference diode 901 can be averaged, resulting in the more stable output.

Thus, in the present embodiment, the bias voltage applied across the diode is controlled to a constant value using the voltage setting circuit, so that the negative feedback effect caused by the interconnection resistance can be reduced. Additionally, in the present embodiment, the dummy diode array A2 is provided as shown in FIG. 31. The reason why the dummy diode array A2 is provided will be described below.

Figure 32:
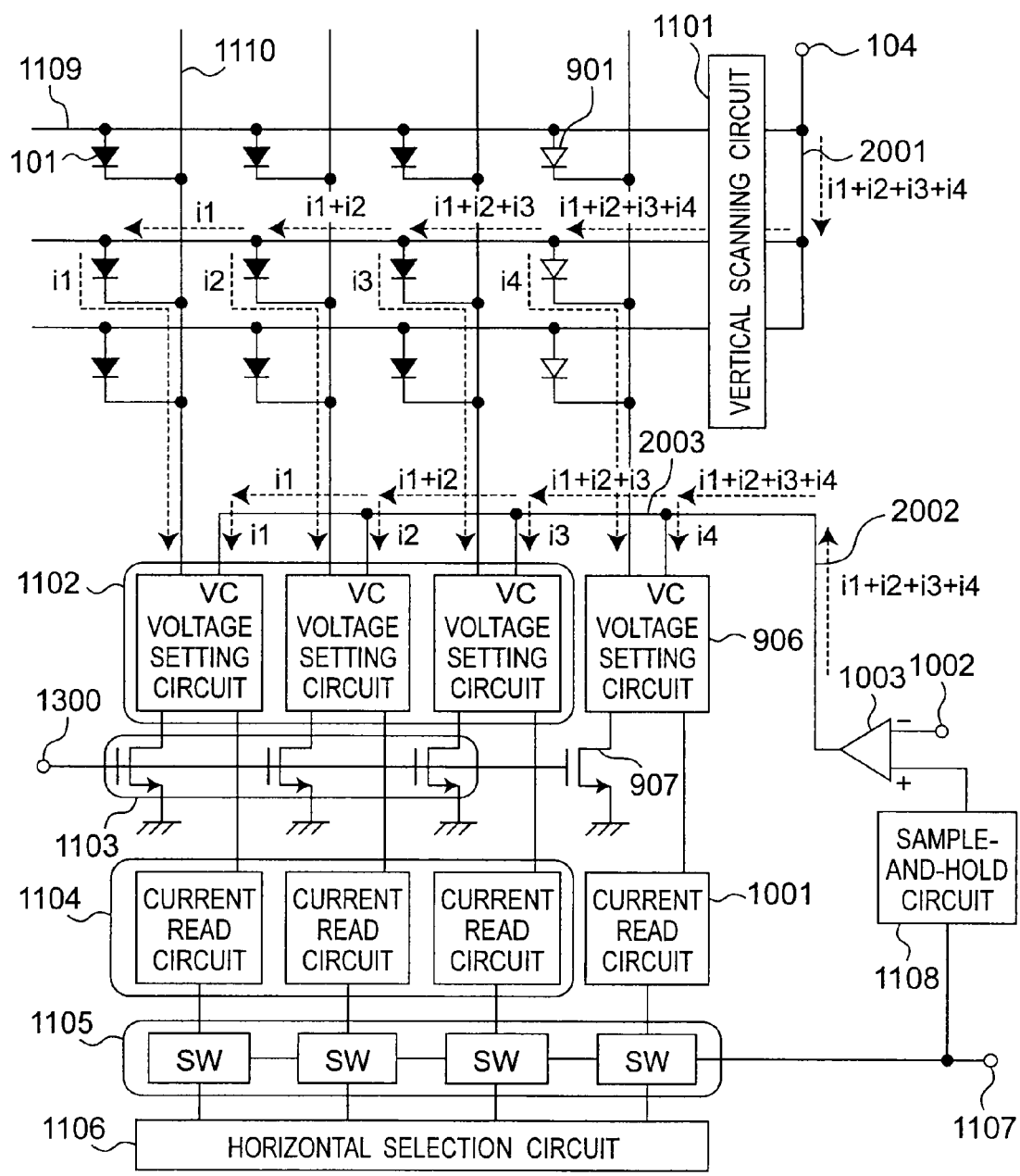
FIG. 32 is a circuit diagram showing a configuration using the thermal infrared detecting device shown in FIG. 31 and including no dummy diode array (with currents indicated, which flows upon reading the second line from the bottom).

FIG. 32 shows a possible configuration in which the dummy diode array is removed in the configuration shown in FIG. 31. Referring to FIG. 32, the diodes 101 are arrayed to form a 3×3 pixel imaging device (pixel array). The reference diode 901 is disposed at the right end of each row. The anodes of the diodes 101 and 901 are commonly connected in each row, and the vertical scanning circuit 1101 sequentially supplies the power supply voltage in each row from the power supply terminal 104. The cathodes of the diodes 101 and 901 are commonly connected in each column. The cathode of the diode 101 is connected to the voltage setting circuit 1102 provided in each column, and the cathode of the reference diode 901 is connected to the voltage setting circuit 906. The outputs of the voltage setting circuits 1102 and 906 are connected to the current sources 1103 and 907 and the current read circuits 1104 and 1001.

The gates of the current sources 1103 and 907 is fed into the predetermined bias voltage 1300, flowing the constant current. The outputs of the current read circuits 1104 and 1001 are connected to the horizontal selection switches 1105. The horizontal selection switches 1005 are sequentially turned on by the control signal from the horizontal selection circuit 1106 to lead the outputs of the current read circuits 1104 and 1001 to the output terminal 1107.

When the output relating to the reference diode 901 is supplied, the sample-and-hold circuit 1108 samples and holds the output, and feeds the output into the non-inverting input terminal of the operational amplifier 1003. The reference voltage is fed into the inverting input terminal of the operational amplifier 1003 from the terminal 1002. Because the reference diodes 901 are provided in each row, the input voltages to the voltage setting circuit 1102 and voltage setting circuit 906 are controlled such that the output of the reference diode 901 is equal to the reference voltage.

FIG. 32 shows a current flow for the readout of the pixel located at the second row from the bottom. When currents flowing through the signal line 1110 of each column is expressed with i1, i2, i3, and i4, respectively, the total current of i1+i2+i3+i4 flows from the power supply terminal 104 (power supply voltage Vdd) through the power supply interconnection 2001. The current of i1+i2+i3+i4 flows through the second drive line which is selected by the vertical scanning circuit 1101. The current of i1+i2+i3+i4 is branched into the currents i1, i2, i3, and i4 in the respective columns. The current i1, i2, i3, or i4 flows through the signal line 1110 of each column, going into the voltage setting circuits 1102 and 906. The voltage setting circuit duplicates the currents of the columns, so that the current having the same current amount of each column, that is, the current i1, i2, i3, or i4 flows in the VC terminals of the voltage setting circuits of each column. The voltage (this voltage is referred to as Vc) supplied from the operational amplifier 1003 is supplied to the VC terminals of the voltage setting circuits 1102 and 906 of columns through the VC interconnection 2002 and horizontal VC interconnection 2003, such that the output of the reference diode is equal to the reference voltage 1002. The total current i1+i2+i3+i4 flows through the VC interconnection 2002. The current i1+i2+i3+i4 flows at the connecting point of the horizontal VC interconnection 2003 and the VC interconnection 2002. The current i4, i3, i2, and i1 is branched into the currents i4, i3, i2, and i1 and goes into the VC terminals of the voltage setting circuits 1102 and 906.

Figure 33:
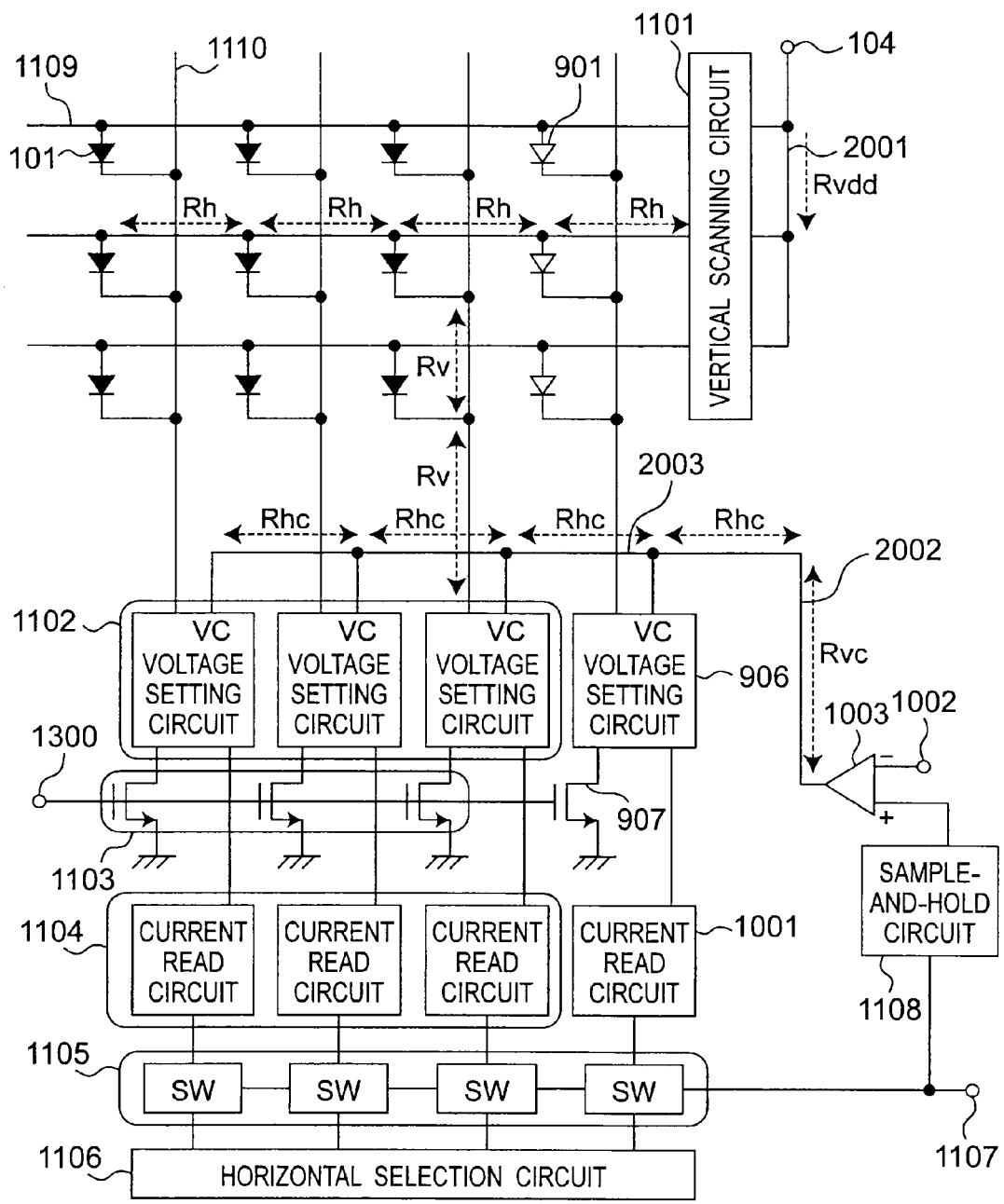
FIG. 33 is a diagram showing resistances of interconnections defined in the circuit of FIG. 32.

As shown in FIG. 33, the resistance value of each interconnection is defined as follows:

Rh: interconnection resistance per unit pixel pitch of the drive line 1109

Rv: interconnection resistance per unit pixel pitch of the signal line 1110

Rvdd: interconnection resistance per unit pixel pitch of the power supply interconnection 2001

Rhc: interconnection resistance per unit pixel pitch of the horizontal VC interconnection 2003

Rvc: total interconnection resistance of the VC interconnection 2002

It is assumed that the resistance value can be neglected for interconnections on the circuit diagram of FIG. 11 of which resistance value is not defined.

For example, assuming that m is the number of columns of the pixel array including the reference pixel and n is the number of rows (m=4 and n=3 in FIGS. 32 and 33), when reading the pixel located at the third column from the left and second row from the bottom, the forward bias voltage Vf applied to the diode can be obtained from the equation (2) if the interconnection resistance is small enough to be negligible. However, if the interconnection resistance cannot be neglected, the forward bias voltage Vf is expressed by the following equation (5).

$$Vf = Vdd - \{Rvdd * (n-2) * (i1 + i2 + i3 + i4) - Rh * (i1 + i2 + i3 + i4) - Rh * (i1 + i2 + i3) - Rv * 2 * i3\} - \{Vc - Rvc * (i1 + i2 + i3 + i4) - Rhc * (i1 + i2 + i3 + i4) - Rhc * (i1 + i2 + i3)\} \tag{5}$$

If, each interconnection is formed such that equations of Rv=Rvdd*m, Rvc=Rvdd*n, and Rhc=Rh are satisfied, when i3=(i1+i2+i3+i4)/m is satisfied in which i3 is the current of the third column, that is, when the current i3 is equal to the average value of the currents of all the columns, the following equation is obtained.

$$Vf = Vdd - Vc \quad (6)$$

The forward bias voltage Vf applied to the diode is always kept at a constant voltage. However, because the current i1, i2, i3, or i4 of each column is a current flowing through the diode currently being read of the pixel of each column at the second row from the bottom, the current i3 is not equal to the average value of the currents of all the columns unless the infrared irradiation amount is even over the pixel array. In this case, the following equation is obtained.

$$Vf = Vdd - Vc - Rvdd*(n-2)*(i1+i2+i3+i4) - Rv*2*i3 + Rvc*(i1+i2+i3+i4) \quad (7)$$

The following equation is obtained from Rv=Rvdd*m and Rvc=Rvdd*n.

$$Vf = Vdd - Vc - Rvdd*(n-2)*(i1+i2+i3+i4) - Rvdd*m*2*i3 + Rvdd*n*(i1+i2+i3+i4) \quad (8)$$

Because of the case in which the current i3 is not equal to the average value of currents of all columns, when $\Delta i$ is a difference value between the current i3 and the average current of all columns, the following equation is obtained.

$$i3 = itot/m + \Delta i \quad (9)$$

$$itot = i1+i2+i3+i4$$

When the above equation is substituted for the equation (8), the following equation is obtained.

$$Vf = Vdd - Vc - Rvdd*(n-2)*itot - Rvdd*m*2* \quad (10)$$
$$(itot/m + \Delta i) + Rvdd*n*itot$$
$$= Vdd - Vc - Rvdd*m*2*\Delta i$$

Further, the equation (8) can be deformed with Rv=Rvdd*m.

$$Vf = Vdd - Vc - Rv*2*\Delta i \quad (11)$$

That is, when the infrared irradiation amount is uneven in the whole pixel array and the difference value $\Delta i$ between the current i3 and the average current of all columns is not zero, the forward bias voltage Vf applied to the diode is obtained by subtracting the voltage value Rv*(m−2)*$\Delta i$ from the constant voltage value defined by Vdd−Vc. In the calculation, it is assumed that the readout is done to the pixel at the second row from the bottom. When the equation is generalized for the case in which the readout is done to the k-th pixel from the bottom, the following equation is obtained.

$$Vf = Vdd - Vc - Rv*k*\Delta i \quad (12)$$

The difference value Rv*k*$\Delta i$ of the forward bias voltage Vf from the constant voltage value indicates that the forward bias voltage Vf is fluctuated according to the row position to be read. It is also found that the fluctuation value is proportional to the difference value $\Delta i$ from the average current of all columns at the focused row. Accordingly, in the case where the interconnection resistance Rv per unit pixel pitch of the signal line 1110 is insufficient low, the forward bias voltage Vf applied to the diode becomes unstable independently from the diode current, which results in the problem in that the decreased sensitivity caused by the negative feedback effect is generated and the sensitivity is fluctuated according to the row position.

Thus, in the case where the thermal infrared detecting device is formed as shown in FIG. 32, unfortunately the decreased sensitivity caused by the negative feedback effect is generated and the sensitivity is fluctuated according to the row position. In order to solve the problem, the dummy diode array A2 is provided in the present embodiment. The effect of the dummy diode array will specifically be described below.

Figure 34:
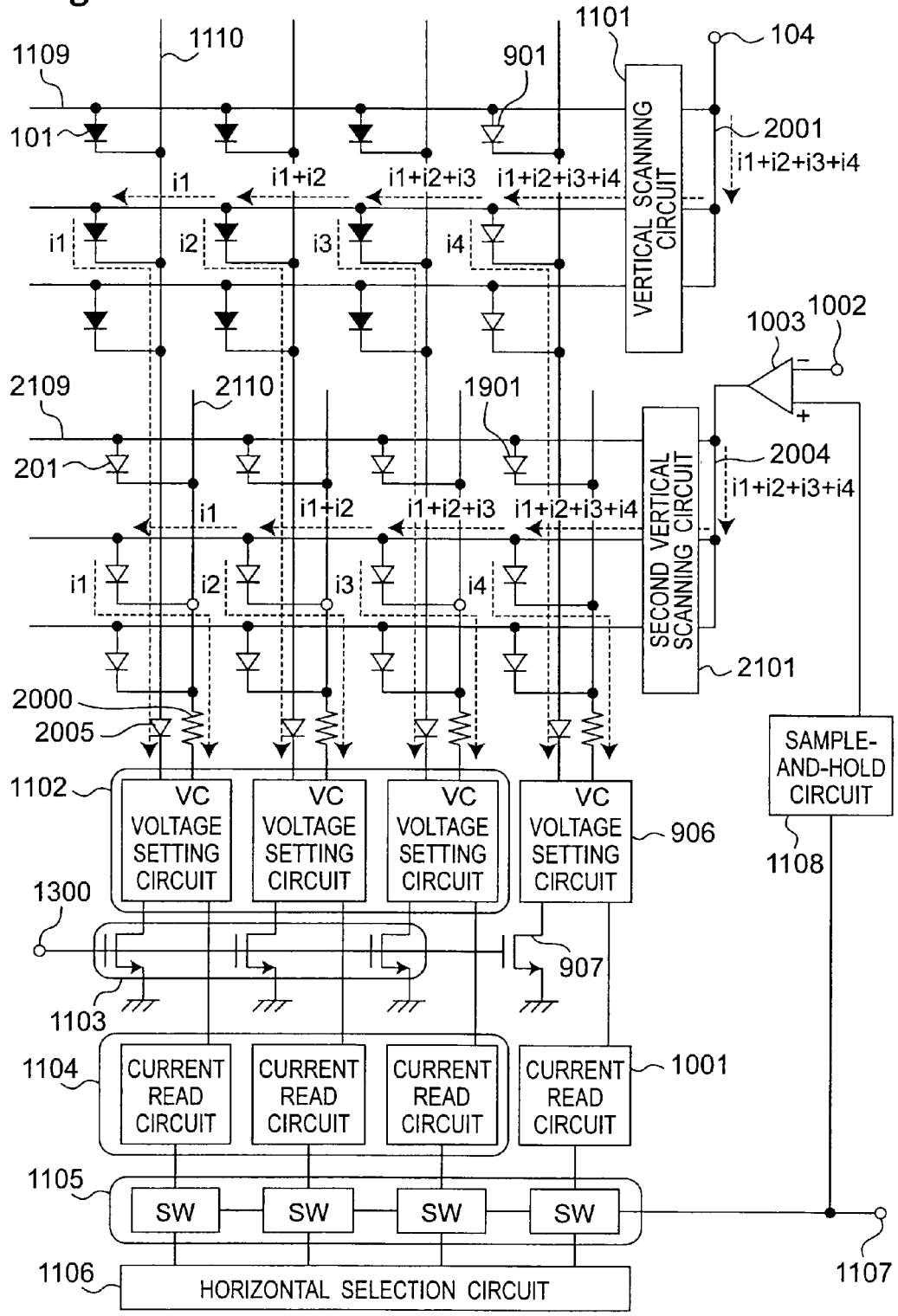
FIG. 34 is a diagram showing currents flowing when reading the second line from the bottom.

FIG. 34 shows a current flow when reading the pixel located at the second row from the bottom in the configuration shown in FIG. 31. A current flowing through the signal line 1110 of each column is expressed as i1, i2, i3, or i4, respectively. The total current i1+i2+i3+i4 of columns flows from the power supply terminal 104 through the power supply interconnection 2001. The current i1+i2+i3+i4 flows through the drive line at the second row selected by the vertical scanning circuit 1101, and is branched into currents i4, i3, i2, and i1. The current i1, i2, i3, or i4 flows through the signal line 1110 of each column, and is fed into the voltage setting circuit 1102 or 906. The voltage setting circuit 1102 or 906 duplicates the current in column, so that the current having the same amount of the current in each column, that is, the current i1, i2, i3, or i4 flows into the VC terminal of the voltage setting circuit 1102 or 906 from the interconnection 2110 of the dummy diode row.

The voltage (this voltage is denoted by Vc) which is supplied from the operational amplifier 1003 such that the outputs of the reference diode 901 and 1901 are equal to the reference voltage 1002 is connected to the second vertical scanning circuit 2101 through the VC vertical line 2004. The second vertical scanning circuit 2101 is operated in synchronization with the vertical scanning circuit 1101. The second vertical scanning circuit 2101 selects the dummy diode matrix array. The operational amplifier 1003 supplies the voltage to the VC terminals of the voltage setting circuits 1102 and 906 through the dummy diode row interconnection 2109, the dummy diode 201, the dummy diode column interconnection 2110, and the adjusting resistor 2000. The total current i1+i2+i3+i4 flows at the point connecting the dummy diode row interconnection 2109 selected by the second vertical scanning circuit 2101 with the second vertical scanning circuit 2101. In each column, each of the currents i4, 13, i2, and i1 flows through the dummy diode of the selected row in each row. The currents i4, i3, i2, and i1 flowing through the columns passes through the dummy diode column interconnection 2110, and flows into the VC terminal of the voltage setting circuit 106 through the adjusting resistor 2000.

Figure 35:
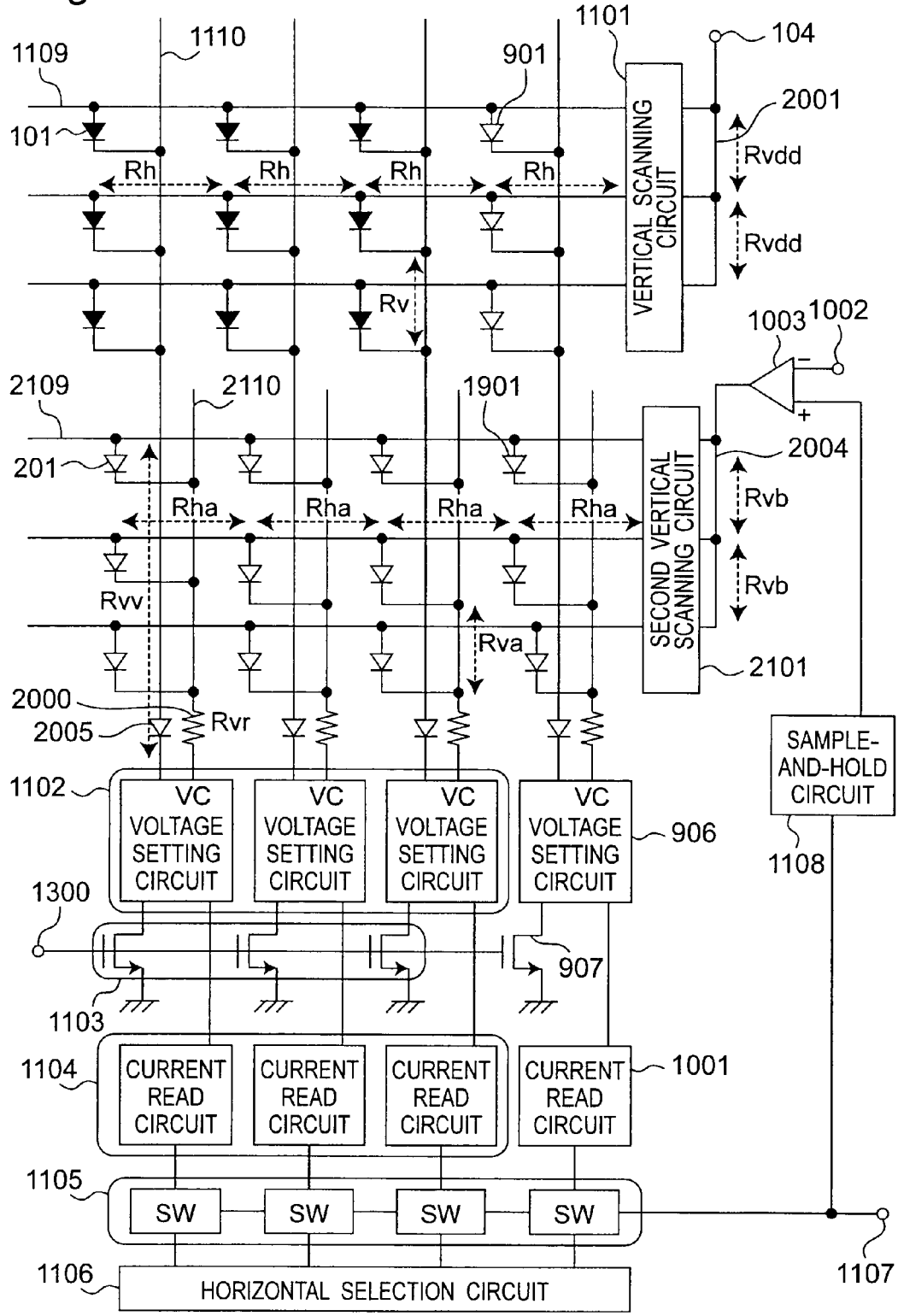
FIG. 35 is a diagram showing resistances of interconnections defined in the circuit of FIG. 31.

For the sake of convenience, as shown in FIG. 35, the resistance value of each interconnection is defined as follows:
Rh: interconnection resistance per unit pixel pitch of the drive line 1109;
Rv: interconnection resistance per unit pixel pitch of the signal line 1110;
Rvdd: interconnection resistance per unit pixel pitch of the power supply interconnection 2001;
Rha: interconnection resistance per unit pixel pitch of the dummy diode row interconnection 2109;
Rva: interconnection resistance per unit pixel pitch of the dummy diode column interconnection 2110;
Rvb: interconnection resistance per unit pixel pitch of the VC vertical line 2004;
Rvv: interconnection resistance of a portion of the signal line 1110 in each column, running through a section in which the dummy diode is formed; and
Rvr: interconnection resistance of the adjusting resistor 2000.

It is assumed to be possible to neglect the resistance value of interconnection on the circuit diagram of FIG. 35 of which resistance value is not defined in FIG. 35. Because the voltage drop generated in the selected dummy diode 201 is canceled by the voltage drop generated in the voltage drop compensation diode 2005 through which the same current is passed, the voltage drop generated in the selected dummy diode 201 is previously removed from the equations to be described later.

When the readout is done to the pixel which is located at the third column from the left and the second row from the bottom, the forward bias voltage Vf applied to the diode can be obtained from the following equation, where m is the number of columns of the pixel array including the reference pixel and n is the number of rows (m=4 and n=3 in FIG. 31).

$$Vf = \tag{13}$$
$$Vdd - \{Rvdd*(n-2)*(i1+i2+i3+i4) - Rh*(i1+i2+i3+i4) -$$
$$Rh*(i1+i2+i3) - Rv*2*i3 - Rvv*i3\} -$$
$$\{Vc - Rvb*(n-2)*(i1+i2+i3+i4) - Rha*(i1+i2+i3+i4) -$$
$$Rha*(i1+i2+i3) - Rva*2*i3 - Rvr*i3\}$$

When each interconnection is formed such that the following equation (14) is satisfied for the resistance value of each interconnection, the equation (13) can be deformed to the equation (15).

$$Rv=Rva=Rvdd*m=Rvb*m, \text{ and } Rh=Rha, \text{ and}$$
$$Rvv=Rvr \tag{14}$$

$$Vf=Vdd-Vc \tag{15}$$

As can be seen from the equation (15), the forward bias voltage Vf applied to the diode always becomes a constant voltage value determined by Vdd−Vc. This can solve the problem that the sensitivity is fluctuated according to the row position and the problem that the decreased sensitivity is caused by the negative feedback effect, even if the current value of each column is not equal to the average current of all columns because the amount of incident infrared ray is uneven in the whole pixel array. With this, a high-performance thermal infrared detecting device capable of suppressing temperature drift with high accuracy can be realized.

In the above example, the dummy diode matrix array A2 has the same number of dummy diodes 201 as the number of diodes 101 included in the pixel array A1. However, it is not always necessary to accord area and pitch of the dummy diode unit with those of the pixel array. It is sufficient that the interconnection resistance satisfies the equation (14). If needed, the adjusting resistor 2000 can be neglected. As long as the circuit configuration of FIG. 31 is provided, in the actual layout (that is, physical arrangement), each dummy diode may be formed in each pixel unit in the pixel array. The circuit is shown in which the feedback loop of the output from the reference diode 901 is formed to apply the voltage Vc. Instead, a constant voltage may be applied as the voltage Vc from a power supply with the feedback loop not formed.

In the voltage setting circuit of the present embodiment, the W/L ratio of the PMOS transistor 1601 and the W/L ratio of the PMOS transistor 1602 may not be equalized to each other. For example, the W/L ratio of PMOS transistor 1601 may be set n (n>1) times the W/L ratio of the PMOS transistor 1602 as shown in FIG. 15 and the W/L ratios of the NMOS transistor 1604 and NMOS transistor 1603 may be set at (n+1):1 in the current mirror circuit for duplicating the current.

In the present embodiment, the selection MOS switch is not formed in the pixel P. As a result, an influence of 1/f noise due to the small-size selection MOS switch generated when the selection MOS switch is formed in the pixel P, is not caused.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application Nos. 2008-001118 filed on Jan. 8, 2008, 2008-116833 filed on Apr. 28, 2008, and 2008-284425 filed on Nov. 5, 2008, which are expressly incorporated herein by reference in its entirety.

What is claimed is:

1. A thermal infrared detecting device comprising:
   a first diode that includes a heat-insulated structure and an infrared absorption section;
   a power supply for supplying a constant power supply voltage to an anode of the first diode through a first interconnection;
   a first voltage setting circuit for setting a voltage across the first diode; and
   a first current read circuit which is connected to a cathode of the first diode through a second interconnection and the voltage setting circuit, for reading a current of the first diode,
   wherein the first voltage setting circuit controls a voltage at a connecting point of the second interconnection and the first voltage setting circuit to a voltage which is obtained by subtracting a voltage drop from a predetermined bias voltage, the voltage drop being generated by a resistance of the first interconnection, a resistance of the second interconnection, and the current of the first diode.

2. The thermal infrared detecting device according to claim 1, further comprising a unit to subtract a constant current from the first diode current to produce a remaining current fed into the first current read circuit.

3. The thermal infrared detecting device according to claim 1 further comprising:
   a subtraction unit configured to perform a subtraction of a first bias current from a current of the first diode, which is connected to the cathode of the first diode through the second interconnection and the first voltage setting circuit, the current of the first diode which is remaining current by the subtraction being read by the first current read circuit;
   a second diode which does not have a heat-insulated structure and/or an infrared absorption section;
   a power supply for supplying a constant power supply voltage to an anode of the second diode through a third interconnection;
   a second voltage setting circuit for setting a voltage across the second diode; and
   a current source which is connected to a cathode of the second diode through a fourth interconnection and the second voltage setting circuit,
   wherein
   the first voltage setting circuit controls the voltage at the connecting point of the second interconnection and the first voltage setting circuit to the voltage which is obtained by subtracting the voltage drop from the predetermined bias voltage, the voltage drop being generated by the resistance of the first interconnection, the resistance of the second interconnection, and the current of the first diode, the second voltage setting circuit controls a voltage at a connecting point of the third interconnection and the second voltage setting circuit to a voltage obtained by subtracting a voltage drop from a predetermined bias voltage, the voltage drop being generated by a resistance of the third interconnection, a resistance of the fourth interconnection, and a current of the second diode, and the first bias current being a current which is duplicated from the current of the current source.

4. The thermal infrared detecting device according to claim 1 further comprising:
a subtraction unit configured to perform a subtraction of a first bias current from a current of the first diode, which is connected to the cathode of the first diode through the second interconnection and the first voltage setting circuit, the current of the first diode which is a remaining current by the subtraction being read by the first current read circuit;
a second diode which does not have heat-insulated structure and/or infrared absorption unit;
a power supply for supplying a constant power supply voltage to an anode of the second diode through a third interconnection;
a second voltage setting circuit for setting a voltage applied across the second diode;
a subtraction unit configured to perform a subtraction of a second bias current from a current of the second diode, which is connected to a cathode of the second diode through a fourth interconnection and the second voltage setting circuit;
a second current read circuit for reading a remaining current of the second diode by the subtraction; and
a bias current determination unit for comparing an output of the second current read circuit with a reference voltage to determine the first and the second bias currents according to a difference between the output of the second current read circuit and the reference voltage,
wherein
the first voltage setting circuit controls the voltage at a connecting point of the second interconnection and the first voltage setting circuit to a voltage obtained by subtracting a voltage drop from a predetermined bias voltage, the voltage drop being generated by the resistance of the first interconnection, the resistance of the second interconnection, and the current of the diode,
the second voltage setting circuit controls a voltage at a connecting point of the third interconnection and the second voltage setting circuit to a voltage obtained by subtracting a voltage drop from a predetermined bias voltage, the voltage drop being generated by a resistance of the third interconnection, a resistance of the fourth interconnection, and the current of the second diode, and
a feedback loop is formed by the bias current determination unit such that the output of the second current read circuit is equal to the reference voltage.

5. The thermal infrared detecting device according to claim 1, wherein the voltage setting circuit includes:
a pair of PMOS transistors of which sources are commonly connected, a drain of one PMOS transistor being connected to an output terminal of the voltage setting circuit;
a current mirror circuit which is connected to a drain of the other PMOS transistor to duplicate the diode current;
a unit for generating a voltage obtained by subtracting the voltage drop from a constant bias voltage using the duplicated current; and
a unit for controlling gate voltages of the pair of PMOS transistors based on a differential voltage between the generated voltage and a source voltage of the pair of PMOS transistors.

6. The thermal infrared detecting device according to claim 1, wherein the voltage setting circuit includes:
a pair of NMOS transistors of which sources are commonly connected, a drain of one NMOS transistor being connected to an input terminal of the voltage setting circuit;
a current mirror circuit which is connected to a drain of the other NMOS transistor to duplicate the diode current;
a unit to generate a voltage adding a voltage drop at the interconnection resistance to a constant bias voltage using the duplicated current; and
a unit for controlling gate voltages of the pair of NMOS transistors based on a differential voltage between the generated voltage and a source voltage of the pair of NMOS transistors.

7. The thermal infrared detecting device according to claim 1, wherein the voltage setting circuit includes:
a PMOS transistor of which source is connected to an input terminal of the voltage setting circuit;
a current mirror circuit for duplicating the diode current, which is connected to a drain of the PMOS transistor and has two output terminals;
a unit for generating a voltage obtained by subtracting the voltage drop from the predetermined bias voltage using the duplicated current supplied through one output terminal; and
a unit for controlling a gate voltage of the PMOS transistor based on a differential voltage between the generated voltage and a source voltage of the PMOS transistor, and
the other output terminal is used as an output terminal of the voltage setting circuit.

8. The thermal infrared detecting device according to claim 1, wherein the voltage setting circuit includes:
a PMOS transistor of which source connected to an input terminal of the voltage setting circuit;
a current mirror circuit for duplicating the diode current, which is connected to a drain of the PMOS transistor and has two output terminals;
a unit for generating a voltage obtained by subtracting the voltage drop from the predetermined bias voltage using the duplicated current supplied through one output terminal;
a unit for controlling a gate voltage of the PMOS transistor based on a differential voltage between the generated voltage and a source voltage of the PMOS transistor; and
a bias current source for subtracting a constant diode current or a diode current varied according to a device temperature from the duplicated current supplied through the other output terminal, and
the subtracted current is used as an output current of the voltage setting circuit.

9. The thermal infrared detecting device according to claim 1 further comprising:
a second diode which does not have a heat-insulated structure and/or an infrared absorption section;
a power supply for supplying a constant power supply voltage to an anode of the second diode through a third interconnection;
a second voltage setting circuit for setting a voltage across the second diode;

a second current read circuit for reading a current of the second diode, which is connected to a cathode of the second diode through a fourth interconnection and the second voltage setting circuit; and a bias voltage determination unit for comparing an output of the second current read circuit with a first reference voltage to determine a second reference voltage based on a difference between the output of the second current read circuit and the first reference voltage, the second reference voltage being fed into the first and the second voltage setting circuits, wherein the first voltage setting circuit controls the voltage at the connecting point of the second interconnection and the first voltage setting circuit to the voltage obtained by subtracting a voltage drop from the second reference voltage, the voltage drop being generated by the resistance of the first interconnection, the resistance of the second interconnection, and the first diode current, the second voltage setting circuit controls a voltage at a connecting point of the third interconnection and the second voltage setting circuit to a voltage obtained by subtracting a voltage drop from the second reference voltage, the voltage drop being generated by a resistance of the third interconnection, a resistance of the fourth interconnection, and the second diode current, and a feedback loop is formed by the bias voltage determination unit such that the output of the second current read circuit is equal to the first reference voltage.

10. A thermal infrared imaging device comprising:
a pixel array including a plurality of pixels which are two dimensionally arrayed, each pixel including a diode having a heat-insulated structure and an infrared absorption section;
a plurality of drive lines which commonly connect anodes of the diodes in each row through a first interconnection resistance;
a plurality of signal lines which commonly connect cathodes of the diodes in each column through a second interconnection resistance;
a vertical scanning circuit for sequentially applying a power supply voltage to the drive lines;
a voltage setting circuit for setting a voltage applied across the diode in each column;
a current read circuit which is connected to an end of the signal line through the voltage setting circuit; and
a horizontal scanning circuit for sequentially reading an output of the current read circuit, wherein
the voltage setting circuit controls a voltage at a connecting point of the signal line and the voltage setting circuit to a voltage obtained by subtracting a voltage drop from a predetermined bias voltage, the voltage drop being generated by the first and second interconnection resistances, resistances of the signal line and drive line, and the diode current.

11. The thermal infrared detecting device according to claim 10, wherein
the pixel includes a MOS transistor which is connected between the diode and the signal line,
the thermal infrared detecting device further comprises:
a plurality of selection lines which commonly connect gates of the MOS transistors in each row;
a common power supply line which commonly connects the drive lines outside the pixel array, the common power supply line being connected to a power supply terminal; and
a vertical scanning circuit for sequentially applying a selection pulse to the selection lines,
the voltage setting circuit sets a voltage across a series circuit of the diode and the MOS transistor, and
the power supply line and the signal line have a substantially identical resistance value.

12. The thermal infrared detecting device according to claim 11, wherein the predetermined bias voltage is determined such that an output corresponding to a column of the diodes not having the heat-insulated structure and/or the infrared absorption section becomes constant.

13. The thermal infrared imaging device according to claim 10, wherein
the pixel array includes at least one row of diode which does not have a heat-insulated structure and/or an infrared absorption section,
a value of the predetermined bias voltage is controlled such that an output of the diode which does not have the heat-insulated structure and/or the infrared absorption section becomes constant.

14. A thermal infrared detecting device comprising:
a diode which includes a heat-insulated structure and an infrared absorption section;
a voltage setting circuit for setting a voltage across the diode; and
a current read circuit for reading a current of the diode, wherein
an anode of the diode is connected to a constant power supply voltage through a first interconnection and the voltage setting circuit,
a cathode of the diode is connected to the current read circuit through a second interconnection, and
the voltage setting circuit controls a voltage at a connecting point of the first interconnection and the voltage setting circuit to a voltage which is obtained by adding a voltage drop to a predetermined bias voltage, the voltage drop being generated by a resistance of the first interconnection, a resistance of the second interconnection, and the current of the diode.

15. The thermal infrared detecting device according to claim 14, further comprising a unit to subtract a constant current from the diode current to produce a remaining current fed into the current read circuit.

16. The thermal infrared detecting device according to claim 14, wherein the voltage setting circuit includes:
a pair of PMOS transistors of which sources are commonly connected, a drain of one PMOS transistor being connected to an output terminal of the voltage setting circuit;
a current mirror circuit which is connected to a drain of the other PMOS transistor to duplicate the diode current;
a unit for generating a voltage obtained by subtracting the voltage drop from a constant bias voltage using the duplicated current; and
a unit for controlling gate voltages of the pair of PMOS transistors based on a differential voltage between the generated voltage and a source voltage of the pair of PMOS transistors.

17. The thermal infrared detecting device according to claim 14, wherein the voltage setting circuit includes:
a pair of NMOS transistors of which sources are commonly connected, a drain of one NMOS transistor being connected to an input terminal of the voltage setting circuit;
a current mirror circuit which is connected to a drain of the other NMOS transistor to duplicate the diode current;

a unit to generate a voltage adding a voltage drop at the interconnection resistance to a constant bias voltage using the duplicated current; and a unit for controlling gate voltages of the pair of NMOS transistors based on a differential voltage between the generated voltage and a source voltage of the pair of NMOS transistors.

18. The thermal infrared detecting device according to claim 14, wherein the voltage setting circuit includes:

a PMOS transistor of which source is connected to an input terminal of the voltage setting circuit;

a current mirror circuit for duplicating the diode current, which is connected to a drain of the PMOS transistor and has two output terminals;

a unit for generating a voltage obtained by subtracting the voltage drop from the predetermined bias voltage using the duplicated current supplied through one output terminal; and a unit for controlling a gate voltage of the PMOS transistor based on a differential voltage between the generated voltage and a source voltage of the PMOS transistor, and the other output terminal is used as an output terminal of the voltage setting circuit.

19. The thermal infrared detecting device according to claim 14, wherein the voltage setting circuit includes:

a PMOS transistor of which source connected to an input terminal of the voltage setting circuit;

a current mirror circuit for duplicating the diode current, which is connected to a drain of the PMOS transistor and has two output terminals;

a unit for generating a voltage obtained by subtracting the voltage drop from the predetermined bias voltage using the duplicated current supplied through one output terminal;

a unit for controlling a gate voltage of the PMOS transistor based on a differential voltage between the generated voltage and a source voltage of the PMOS transistor; and a bias current source for subtracting a constant diode current or a diode current varied according to a device temperature from the duplicated current supplied through the other output terminal, and the subtracted current is used as an output current of the voltage setting circuit.

* * * * *